(12) United States Patent
Hiraren et al.

(10) Patent No.: US 9,377,664 B2
(45) Date of Patent: Jun. 28, 2016

(54) PHOTOCROMIC COMPOSITION

(75) Inventors: Toshimitsu Hiraren, Ibaraki (JP);
Katsuhiro Mori, Ibaraki (JP);
Yasutomo Shimizu, Ibaraki (JP)

(73) Assignee: Tokuyama Corporation, Yamaguchi (JP)

( * ) Notice: Subject to any disclaimer, the term of this patent is extended or adjusted under 35 U.S.C. 154(b) by 222 days.

(21) Appl. No.: 14/111,393

(22) PCT Filed: Apr. 12, 2012

(86) PCT No.: PCT/JP2012/060029
§ 371 (c)(1),
(2), (4) Date: Oct. 11, 2013

(87) PCT Pub. No.: WO2012/141250
PCT Pub. Date: Oct. 18, 2012

(65) Prior Publication Data
US 2014/0029079 A1 Jan. 30, 2014

(30) Foreign Application Priority Data
Apr. 13, 2011 (JP) .................................. 2011-088988

(51) Int. Cl.
*C08G 18/02* (2006.01)
*C08G 18/42* (2006.01)
*C08G 18/44* (2006.01)
*C08G 18/73* (2006.01)
*C08G 18/75* (2006.01)
*C08G 18/79* (2006.01)
*C08K 5/00* (2006.01)
*C08K 5/1545* (2006.01)
*C09K 9/02* (2006.01)
*G02B 1/04* (2006.01)
*G02B 5/23* (2006.01)
*G02F 1/153* (2006.01)

(52) U.S. Cl.
CPC ............ *G02F 1/1533* (2013.01); *C08G 18/022* (2013.01); *C08G 18/4277* (2013.01); *C08G 18/44* (2013.01); *C08G 18/73* (2013.01); *C08G 18/755* (2013.01); *C08G 18/792* (2013.01); *C08K 5/1545* (2013.01); *C09K 9/02* (2013.01); *G02B 1/04* (2013.01); *G02B 5/23* (2013.01); *C08K 5/0041* (2013.01); *C09K 2211/1007* (2013.01); *C09K 2211/1029* (2013.01); *C09K 2211/1033* (2013.01); *C09K 2211/1088* (2013.01)

(58) Field of Classification Search
CPC ..... G02F 1/1533; G02F 2202/14; G02B 1/04; G02B 5/23; C08B 18/73; C08B 18/755; C08B 18/792; C08B 18/022; C08B 18/4277; C08B 18/44; C08K 5/0041; C08K 5/1545; C09K 9/02; C09K 2211/1007; C09K 2211/1029; C09K 2211/1033; C09K 2211/1088

See application file for complete search history.

(56) References Cited

U.S. PATENT DOCUMENTS

| | | | |
|---|---|---|---|
| 4,791,185 A | | 12/1988 | Kanemura et al. |
| 6,187,444 B1 * | | 2/2001 | Bowles et al. ............. 428/423.1 |
| 6,367,930 B1 * | | 4/2002 | Santelices et al. ....... 351/159.61 |
| 2002/0006505 A1 | | 1/2002 | Nishizawa et al. |
| 2002/0009599 A1 | | 1/2002 | Welch et al. |
| 2004/0096666 A1 | | 5/2004 | Knox et al. |
| 2005/0168690 A1 | | 8/2005 | Kawai et al. |
| 2005/0233153 A1 * | | 10/2005 | Qin et al. ................. B32B 27/18 428/423.1 |
| 2007/0259117 A1 | | 11/2007 | Archey et al. |
| 2012/0216905 A1 | | 8/2012 | Pacetti |
| 2013/0215488 A1 | | 8/2013 | Hiraren et al. |
| 2013/0324631 A1 | | 12/2013 | Kuwamura et al. |

FOREIGN PATENT DOCUMENTS

| | | |
|---|---|---|
| EP | 0268896 A2 | 6/1988 |
| EP | 2067060 B1 | 7/2010 |
| EP | 2204395 A1 | 7/2010 |
| JP | 09-100469 A | 4/1997 |
| JP | 2003519398 A | 6/2003 |
| JP | 2005181426 A | 7/2005 |
| JP | 2005215640 A | 8/2005 |
| JP | 2005-305306 A | 11/2005 |
| JP | 2009-535675 A | 10/2009 |

OTHER PUBLICATIONS

Odian, George, Princiiples of Polymerization, Third Edition, 1991, pp. 29-33.*
European Application No. 12771637.1, Supplementary European Search Report, dated Aug. 28, 2014.
International application No. PCT/JP2012/060029, Notification of Transmittal of Translation of the International Preliminary Report on Patentability, dated Oct. 15, 2013.
English Abstract of JPH09-100469.

(Continued)

*Primary Examiner* — Patrick Niland
(74) *Attorney, Agent, or Firm* — Cahn & Samuels, LLP

(57) ABSTRACT

Provided is a photochromic composition which can function as an adhesive layer for bonding optical sheets made from a polycarbonate resin or the like and a laminated article using said composition exhibits excellent tight adhesion, heat resistance and photochromic properties. In particular, provided is a photochromic composition which can prevent an elution of the composition from the optical sheets when embedding and polymerizing in a polymerizable monomer. The photochromic composition comprises a polyurethane resin (A) having an isocyanurate structure and a photochromic compound (B).

15 Claims, No Drawings

(56) References Cited

OTHER PUBLICATIONS

English Abstract of JP2003519398 (A).
English Abstract of JP2005181426 (A).
English Abstract of JP2005215640 (A).

* cited by examiner

PHOTOCROMIC COMPOSITION

TECHNICAL FIELD

This application is a U.S. national stage application of PCT/JP2012/060029 filed on 12 Apr. 2012 which claims priority of Japanese patent document 2011-088988 filed on 13 Apr. 2011, the entireties of which are incorporated herein by reference.

The present invention relates to a novel photochromic composition. In concrete, the present invention relates to a novel photochromic composition suitably used as a photochromic adhesive agent, particularly as a photochromic adhesive agent for binding optical sheets or films made of polycarbonate resins with each other. Also, the present invention relates to an optical article having a multilayer structure made by binding the optical sheets or films with each other via the adhesive layer comprising the photochromic composition.

BACKGROUND OF THE INVENTION

Recently especially in United States, the needs is rapidly increasing for a plastic lens using a polycarbonate resin of transparent and having excellent impact resistance, for the use of the sunglasses with a dizziness prevention property. Further, in regards with such plastic sunglass, the photochromic sunglass made of plastic (a photochromic lens) is rapidly becoming popular which can control the dizziness prevention property by changing a transparency depending on the surrounding brightness by including a photochromic compound.

The photochromic lens is manufactured with various methods. In concrete, a method, wherein a coating composition including a photochromic compound is coated on the surface of plastic lens, and a method, wherein the photochromic compound is mixed in a material of plastic lens itself and lens is formed, can be exemplified.

Further, the following method is now being examined considering that it can be partly processed, it is possible to form a smooth photochromic layer, and it is possible to provide photochromic properties at the time when manufacturing a plastic lens by an injection molding. Namely, it is a method to use a photochromic adhesive agent (a photochromic composition) including a photochromic compound and a polyurethane resin. In concrete, "a photochromic laminated article", wherein optical sheets such as polycarbonate resins are mutually bound by said photochromic adhesive agent, is manufactured at first, subsequently, said laminated article is installed in a metal mold for a lens forming, and then an injection molding or a thermocompression is performed. With this method, a photochromic lens having the laminated article can be manufactured (See Patent Articles 1 to 4). Thus obtained photochromic lens binds the laminated article and a plastic lens by an injection molding or a thermocompression. Therefore, an adhesion between an interface of the laminated article and the lens becomes extremely high.

On the other hand, with the methods described in patent articles 3 and 4, However, there was a problem of releasing optical sheets due to an insufficient adhesion between the optical sheets and the photochromic adhesive agent, when using the optical articles manufactured with the above patent articles 1 and 2. This may be due to a structure of the polyurethane resin, which is a main component of an adhesive agent (There was a case wherein optical sheets are released due to an insufficient adhesion of a photochromic laminated article itself.). In addition, there was a problem of generating an optical strain or so when performing an injection molding or a thermocompression, due to an insufficient heat resistance of the polyurethane resin. Therefore, it is required to improve heat resistance of a matrix resin (a polyurethane resin) itself of a layer comprising the adhesive agent.

However, the polyurethane resin of 2 liquid type (a mixture of a compound having an isocyanate group at a terminal end and a compound having a hydroxyl group at a terminal end) is used in the methods described in patent articles 3 and 4. This is a method to form a high-molecular-weight urethane resin layer (an adhesive agent layer) by laminating a composition including the polyurethane resin of 2 liquid type and the photochromic compound on an optical sheet, and then by making the polyurethane resin of 2 liquid type to react. Said composition before the lamination has a relatively low molecular compound; and that with this method, there is an advantage of not lowering the solubility of the composition itself and the same of the photochromic compound. In addition, the polyurethane resin of 2 liquid type is made to react to make a high-molecular-weight a polyurethane resin after the lamination; thus its heat resistance can also be improved.

However, even with the photochromic adhesive agent obtained by the above method, an adhesion of the photochromic laminated article itself was insufficient; and that a problem of releasing the optical sheets was unable to be sufficiently solved. The photochromic lens may contact high humidity or warm water when used in everyday life. And that an adhesion between optical sheets and an adhesive agent must be high even under such circumstances. Namely, optical sheets are desired to firmly bind even when the photochromic laminated article itself is under such circumstances. With the photochromic adhesive agent obtained from the reacted polyurethane resin of 2 liquid type, it was difficult to maintain a high adhesion between optical sheets and the adhesive agent after contacting with warm water and the like, while maintaining a high photochromic properties; and there was a room for an improvement.

Further, besides the above injection molding or thermocompression, the following method is suggested as a manufacturing method of the photochromic lens using "a photochromic laminated article". In concrete, it is a method wherein a photochromic lens is formed by polymerizing and cuing a polymerizable monomer after immersing the photochromic laminated article in said polymerizable monomer (See Patent Articles 4 and 5). With this method, capabilities of the obtained lens can be easily changed by changing a kind of polymerizable monomer; and that lens provided with various capabilities can be manufactured. Further, a photochromic lens can be manufactured at a relatively low temperature when compared to an injection molding or thermocompression; and that strain of lens due to a heat can be reduced.

However, there was a room for an improvement considering the following points when a method described in patent articles 5 and 6 were used. Patent articles 5 and 6 suggest a use of a thermosetting polyurethane resin of 2 liquid type, comprising polyurethane prepolymer and curing agent, as a photochromic adhesive agent. When a thermosetting polyurethane resin described in patent articles 5 and 6 are used, there was a case when a thermosetting polyurethane resin or a photochromic compound is dissolved from a photochromic laminated article in a polymerizable monomer depending on a kind of a polymerizable monomer or a polymerization condition. This elution generates at an end part of a photochromic laminated article. This end part, wherein the photochromic laminated article eluted, is required to be removed from lens. Thus, an effective area of lens became small as this elution part became small; and there was a room for an improvement. Further, when said eluted part is removed from lens, an end face of a photochromic laminated article exists on the same surface with the same of a photochromic lens; and that an adhesion of the thermosetting polyurethane resin may be insufficient and there was a possibility of releasing lens.

[Patent 1] US Patent Application Laid Open No 2004096666
[Patent 2] JP Patent Application Laid Open No. 2003-519398
[Patent 3] US Patent Application Laid Open No 20050233153
[Patent 4] US Patent Application Laid Open No 20020006505
[Patent 5] JP Patent Application Laid Open No. 2005-181426
[Patent 6] JP Patent Application Laid Open No. 2005-215640

SUMMARY OF INVENTION

As mentioned, with a method to manufacture a photochromic lens using a photochromic laminated article, it was required to improve an adhesion between a photochromic adhesive agent (a photochromic composition) and optical sheets and to improve heat resistance of the photochromic adhesive agent itself. In addition, it was required to improve a solubility resistance (may be described as a solvent resistance, hereinafter) to a polymerizable monomer, which becomes a base material of lens after polymerization. A photochromic composition satisfying these capabilities can be used for a manufacturing method of a photochromic lens by an injection molding•thermocompression, and for a method embedding in a polymerizable monomer.

Therefore, the first object of the present invention is to provide a photochromic composition showing a superior adhesion and a heat resistance, an excellent and a good photochromic property, when used as an adhesive layer (an adhesive agent) for binding optical sheets or films.

Further, the second object of the present invention is to provide an optical article, including a multilayer structure (e.g. a photochromic laminated article) in which optical sheets or films are bound by an adhesive layer having a photochromic property, having an excellent adhesion, a heat resistance, and a photochromic property.

Further, the third object of the present invention is to provide a method of capable of producing the optical article without damaging the appearance even in case the thermoplastic resin such as polycarbonate or so is used as the optical sheet or film.

In order to solve above mentioned problem, the present inventors have carried out keen examination concerning the relation between a structure of a photochromic adhesive sheet (layer) and the characteristic of the obtained optical article. As a result, in case of using a polyurethane resin having an isocyanurate structure (hereinafter, it may be simply referred to as "an isocyanurate polyurethane resin") and a photochromic composition including a photochromic compound as the above photochromic adhesive agent, the present inventors have found that an adhesion of the obtained photochromic laminated article (an adhesion between an adhesive agent layer and optical sheets), a heat resistance, a photochromic property, a weather resistance, and a solvent resistance of the photochromic laminated article can be improved.

In addition, in case of forming the above mentioned photochromic adhesive layer without using an organic solvent, or in case of manufacturing a photochromic laminated article using said photochromic adhesive sheet by drying (removal of the solvent) after forming the cast membrane using said organic solvent and separately preparing the above photochromic adhesive sheet, the present inventors have found that the bad influence caused by the solvent can be avoided and the photochromic property does not decline, thereby the present invention was accomplished.

That is, the present invention is the photochromic composition comprising a polyurethane resin (A) having an isocyanurate structure and a photochromic compound (B).

According to the present invention, among all, said polyurethane resin (A) having the isocyanurate structure is preferably the polyurethane resin obtained by reacting, a polyol compound (A1) having two or more hydroxyl groups in the molecule, and having a number-average molecular weight of 400 to 3,000, an isocyanurate compound (A2a) having an isocyanurate structure and three isocyanate groups in the molecule,
a diisocyanate compound (A2b) having two isocyanate groups in the molecule, and
a chain extender (A3) having two or more groups capable of reacting with the isocyanate groups in the molecule, and having a molecular weight of 50 to 300.

In addition, the polyurethane resin (A) having the isocyanurate structure is a non-reactive polyurethane resin, to which a reaction terminator (A4), having one group capable of reacting with the isocyanate group, is bound to a terminal end of the molecule.

Further, the photochromic composition of the present invention comprises said isocyanate compound (C) having at least one of the isocyanate group in the molecule and/or said organic solvent (D).

The present invention is an optical article having a multilayer structure wherein two optical sheets or optical films facing each other are bound via an adhesive layer obtained by the photochromic composition.

The present invention is a production method of the optical article, comprising a step of preparing a photochromic adhesive sheet comprising the polyurethane resin (A) having the isocyanurate structure and the photochromic compound (B), by extending the an organic solvent (D) included photochromic composition on a flat and smooth base material, then removing the organic solvent (D) by drying and separating said flat and smooth base material; and
a step of forming said multilayer structure by binding the two optical sheets or optical films by placing said photochromic adhesive sheet in between the two optical sheets or optical films facing each other.

The photochromic composition of the present invention functions as the adhesive agent or the binder. A laminated article (a photochromic laminated article) binding the optical sheets or films formed of polycarbonate resin or so by using the adhesive layer of polyurethane resin having the isocyanurate structure (isocyanurate polyurethane resin) shows an excellent adhesion, a photochromic characteristic (a color optical density, a color fading speed, a durability or so), a heat resistance and a solvent resistance.

Further, the above adhesive layer shows an excellent adhesion and a heat resistance; and thus, even when manufacturing a photochromic lens (an optical article) by the injection molding•thermocompression, said adhesion or its photochromic properties are difficult to be lowered and an optical strain is also difficult to be generated.

Further, as the above mentioned adhesive layer shows an excellent adhesion and a solvent resistance, even when a photochromic laminated article is embedded in a polymerizable monomer to manufacture a photochromic lens (an optical article), an elution of an isocyanurate polyurethane resin and a photochromic compound forming such adhesive layer can be minimized as much as possible. As a result, an effective area of a photochromic lens can be improved, enhancing its productivity.

According to the method of the present invention, even when a thermoplastic resin such as polycarbonate or so is used as the optical sheets or films, the bad influence caused by the organic solvent can be avoided; hence the photochromic property is not lowered.

DETAILED DESCRIPTION OF THE INVENTION

A photochromic composition of the present invention comprises an isocyanurate polyurethane resin (A) (hereinafter it may be simply referred to as "A" component), and a photochromic compound (B) (hereinafter it may be simply referred to as "B" component). Herein below, these "A" component and "B" component will be described.

"A" Component: An Isocyanurate Polyurethane Resin

According to the present invention, "A" component is a polyurethane resin having an isocyanurate structure in a molecule. The isocyanurate structure is the following formula:

[Chemical formula 1]

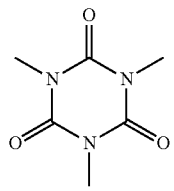

An isocyanurate polyurethane resin is a resin having the structure in a molecule.

According to a conventional invention, although a resin of diisocyanate compound or triisocyanate compound was used for the polyurethane resin constituting the adhesive layer, its adhesion, heat resistance and a solvent resistance was not always sufficient. Thus, when manufacturing lens by embedding a photochromic laminated article, having the adhesive layer using conventional polyurethane resin, in a polymerizable monomer and by thermosetting thereof, there was a case when the polyurethane resin or the photochromic compound eluted from the adhesive layer.

According to the present invention, an adhesion, a heat resistance and a solvent resistance can be improved due to a usage of an isocyanurate polyurethane resin. Although a reason for the exhibition of such effects is not obvious, it is supposed as following. An isocyanurate polyurethane resin has the above mentioned annular structure in the molecule; and it is possible to have three molecular chains therefrom. Therefore, a degree of cross-linkage can be improved and an adhesion, a heat resistance and a solvent resistance of the adhesive layer can be improved as well. Further, with this annular structure, the degree of cross-linkage can be enhanced, while forming a suitable space in a molecule. As a consequence, a reversible reaction of a photochromic compound in the adhesive layer becomes easy; and the obtained optical article is considered to exhibit an excellent photochromic properties.

According to the present invention, a manufacturing method of "A" component is not particularly limited, as long as an isocyanurate structure is included in the molecule. Among all, it is preferable to use the following each component to manufacture an isocyanurate polyurethane resin in order for the obtained photochromic composition to exhibit an excellent heat resistance, adhesion, photochromic properties and a solvent resistance. In concrete, it is preferable that (A1) (hereinafter, it may be simply referred to as A1 component) a polyol compound having two hydroxyl groups in a molecule, having a number-average molecular weight of 400 to 3,000, (A2a) (hereinafter, it may be simply referred to as A2a component) an isocyanurate compound having an isocyanurate structure and three isocyanate groups in a molecule, (A2b) (hereinafter, it may be simply referred to as A2b component) a diisocyanate compound having two isocyanate groups in a molecule, and (A3) (hereinafter, it may be simply referred to as A3 component) a chain extender having two or more groups capable of reacting with an isocyanate group in a molecule, having a molecular weight of 50 to 300 are made to react to manufacture an isocyanurate polyurethane resin (A). Hereinafter, these components are described. Note that the isocyanurate compound of A2a component and the diisocyanate compound of A2b component are sometimes merely called a polyisocyanate compound (hereinafter, it may be simply referred to as A2 component).

(A1 Component: A Polyol Compound)

As for the polyol compound of A1 component, from the point that the prepared "A" component is not excessively highly crosslinked, preferably two to six hydroxyl groups are included in a molecule. And further, considering the solubility to the organic solvent, the number of the hydroxyl group included in a molecule are preferably 2 to 3.

A number-average molecular weight of the A1 component is preferably 400 to 3,000. This A1 component is a polymer; and that its molecular weight is shown by a number-average molecular weight. In view of a heat resistance of the obtained "A" component and photochromic properties (a color optical density, a color fading speed, a weather resistance or so) of the photochromic composition, especially, a weather resistance of the photochromic compound, said number-average molecular weight is preferably 400 to 2,500, more preferably 400 to 1,500.

Further, a well-known polyol compound can be used as A1 component used without any limitation. In concrete, it is preferable to use polyol compounds such as polyether polyol, polycarbonate polyol, polycaplolactone polyol, polyester polyol and the like. These may be used alone or by combining two or more thereof. Among all, it is preferable to use polycarbonate polyol or polycaplolactone polyol in view of a heat resistance, an adhesion, a weather resistance, a hydrolysis resistance and the like. Herein below, various compounds used as A1 component will be described in detail.

(Polyether Polyol)

As for polyether polyol used as A1 component, polyether polyol compounds obtained by a reaction between "an alkylene oxide" and "a compound having two or more of active hydrogen containing group in a molecule"; and polymer-polyol, urethane modified polyetherpolyol, and polyetherestercopolymer polyol or so which are the modification of said polyether polyol may be mentioned.

Note that, as for "the compound having two or more active hydrogen containing groups in a molecule", water, ethyleneglycol, propyleneglycol, butanediol, glycerin, trimethylolpropane, hexanetriol, triethanolamine, diglycerin, pentaerythritol, trimethylolpropane, hexanetriol or so may be mentioned, and these may be used alone or by combining two or more thereof. Also, as for said alkylene oxide, cyclic ether compound such as ethylene oxide, propylene oxide, and tetrahydrofurane or so may be mentioned, and these may be used alone or by combining two or more thereof.

Such polyether polyol can be obtained as a chemical reagent or as for the industrial use, and as for the commercially available examples, "EXENOL™" series and "EMULSTAR™" made by ASAHI GLASS CO., Ltd, "ADEKA POLYETHER" series made by ADEKA CORPORATION or so may be mentioned.

(Polycarbonate Polyol)

As for polycarbonate polyol used as A1 component; polycarbonate polyol obtained by phosgenation of one or more of low molecular polyols such as ethylene glycol, 1,2-propanediol, 1,3-propanediol, 1,2-butanediol, 1,3-butanediol, 1,4-butanediol, 1,5-pentanediol, 1,6-hexanediol, 1,8-octanediol, 1,9-nonanediol, 3-methyl-1,5-pentanediol, 2-ethyl-4-butyl-1,3-propanediol, diethyleneglycol, dipropyleneglycol, neopentylglycol, cyclohexane-1,4-diol, cyclohexane-1,4-dimethanol, dimer acid diol, ethylene oxide adduct or propylene oxide adduct of bisphenol A, bis(β-hydroxyethyl) benzene, xylene glycol, glycerin, trimethylolpropane, pentaerythritol; or polycarbonate polyol obtained by ester exchange method from ethylenecarbonate, diethylcarbonate, and diphenylcarbonate or so may be mentioned.

These polycarbonate polyol can be obtained as a chemical reagent or as for industrial use, and as for the commercially available examples, "DURANOL™" series made by Asahi Kasei Chemicals Corporation, "Kuraray Polyol™" series made by KURARAY CO., LTD, "Praccel™" series made by DAICEL CORPORATION, "NIPPOLAN™" series made by NIPPON POLYURETHANE INDUSTRY CO., LTD, "ETERNACOLL™" series made by UBE INDUSTRIES LTD or so may be mentioned.

As for the A1 component, it is preferable to use polycarbonate polyol in view of the heat resistance, the adhesion, the weather resistance and the hydrolysis resistance or so. In particular, it is preferable to use the A1 component using the polycarbonate polyol when manufacturing the laminated article by binding optical sheets or films comprising the polycarbonate resin, due to the adhesive layer and the adherend layer to have the same structure and to an improvement in their affinity.

(Polycaprolactone Polyol)

As polycaprolactone polyol used for A1 component, the compound obtained by ring-opening polymerization of ε-caprolactone can be used.

These polycaprolactone polyol can be obtained as a chemical reagent or as for the industrial use, and as for the commercially available example; "Praccel™" series made by DAICEL CORPORATION may be mentioned.

(Polyester Polyol)

As polyester polyol used for A1 component, polyester polyol, obtained by condensation reaction between "polyvalent alcohol" and "polybasic acid", or so may be mentioned. Here, as said "polyvalent alcohol", ethyleneglycol, 1,2-propanediol, 1,3-butanediol, 1,4-butanediol, 3-methyl-1,5-pentanediol, 1,6-hexanediol, 3,3'-dimethylolheptane, 1,4-cyclohexanedimethanol, neopentylglycol, 3,3-bis(hydroxymethyl)heptane, diethyleneglycol, dipropyleneglycol, glycerin, trimethylolpropane or so may be mentioned; and these may be used alone or by combining two or more thereof. Also, as said "polybasic acid", succinic acid, adipic acid, azelaic acid, sebacic acid, dodecanedicarboxylic acid, cyclopentanedicarboxylic acid, cyclohexanedicarboxylic acid, ortophthalic acid, isophthalic acid, terephthalic acid, naphthalenedicarboxylic acid or so may be mentioned; and these may be used alone or by combining two or more thereof These polyesterpolyol can be obtained as a chemical reagent or as for the industrial use, and as for the commercially available example; "POLYLITE™" series made by DIC Corporation, "NIPPOLAN™" series made by NIPPON POLYURETHANE INDUSTRY CO., LTD, "MAXIMOL™" series made by KAWASAKI KASEI CHEMICALS LTD or so may be mentioned.

(A2 Component: The Polyisocyanate Compounds)

It is preferable to manufacture the "A" component using at least 2 kinds of polyisocyanate compound (A2 component). And said A2 component comprises an isocyanurate compound (A2a) having an isocyanurate structure and three isocyanate groups in a molecule, and a diisocyanate compound (A2b) having two isocyanate groups in a molecule The A2a component is at least a kind of a compound selected from a trimer of an aliphatic polyisocyanate compound, an alicyclic polyisocyanate compound and an aromatic polyisocyanate compound. The A2a component is a compound having the isocyanurate structure in the molecule, having three isocyanate groups. While the A2b component is at least a kind of compound selected from an aliphatic diisocyanate compound, an alicyclic diisocyanate compound and an aromatic diisocyanate compound.

(A2a Component: An Isocyanurate Compound Having an Isocyanurate Structure in the Molecule, Having Three Isocyanate Groups.)

According to the present invention, a polyurethane resin having the isocyanurate structure can be easily obtained by using this A2a component when manufacturing "A" component.

A2a component is obtained by a trimerizing reaction of a polyisocyanate compound having a plural number of isocyanate groups. In concrete, it is manufactured as following. A2a component can be obtained by a reaction of polyisocyanate compound, in an existence of a catalyst for an isocyanurate reaction, generally at a reaction temperature of 40 to 120° C., in absence of a solvent or in an existence of ketone series solvents such as toluene, xylene, the other aromatic solvent, methylethylketone, methylisobutylketone or so; ester solvents such as ethyl acetate, butyl acetate or so; glycol ether ester solvents such as propylene glycol methyl ether acetate, ethyl-3-ethoxy-propionate or so. For more detail, as polyisocyanate compound becoming a raw material of A2a component, an aliphatic polyisocyanate compounds, an alicyclic polyisocyanate compound, an aromatic polyisocyanate compound, and the mixture thereof can be exemplified. Among these, from the point of the weather resistance, at least a kind of polyisocyanate compound selected from the aliphatic polyisocyanate compound and the alicyclic polyisocyanate compound are preferably used. The most preferable embodiment is to use only the aliphatic polyisocyanate compound and/or the alicyclic polyisocyanate compound. In addition, A2a component is an isocyanurate compound having three isocyanate groups in the molecule; and thus, it is preferable to use diisocyanate compounds as polyisocyanate compounds which become its raw material.

For examples of polyisocyanate compound suitably used for a raw material of A2a component, the aliphatic polyisocyanate compounds such as diethylenediisocyanate, tetramethylene-1,4-diisocyanate, hexamethylene-1,6-diisocyanate, octamethylene-1,8-diisocyanate, 2,2,4-trimethylhexane-1,6-diisocyanate or so; the alicyclic polyisocyanate compound such as cyclobutane-1,3-diisocyanate, cyclohexane-1,3-diisocyanate, cyclohexane-1,4-diisocyanate, 2,4-methylcyclohexyldiisocyanate, 2,6-methylcyclohexyldiisocyanate, isophoronediisocyanate, norbornenediisocyanate, isomer mixtures of dicyclohexylmethan 4,4'-diisocyanate, hexahydrotoluene-2,4-diisocyanate, hexahydrotoluene-2,6-diisocyanate, hexahydrophenylene-1,3-diisocyanate, hexahydrophenylene-1,4-diisocyanate, 1,9-diisocyanato-5-methyl nonane, 1,1-bis(isocyanatomethyl)cyclohexane, 2-isocyanato-4-[(4-isocyanatocyclohexyl)methyl]-1-methylcyclohexane, 2-(3-isocyanatopropyl)cyclohexylisocyanate or so; the aromatic polyisocyanate compound such as phenylcyclohexylmethandiisocyanate, isomer mixtures of 4,4'-methylenebis(phenylisocyanate), toluene-2,3-diisocyanate, toluene-2,4-diisocyanate, toluene-2,6-diisocyanate, phenylene-1,3-diisocyanate, phenylene-1,4-diisocyanate, 1,3-bis(isocyanatomethyl)benzene, xylylenediisocyanate, tetramethylxylylenediisocyanate, naphthalenediisocyanate, diphenyletherdiisocyanate, 1,3-diisocyanatomethylbenzene, 4,4'-diisocyanato-3,3'-dimethoxy(1,1'-biphenyl), 4,4'-diisocyanato-3,3'-dimethylbiphenyl, 1,2-diisocyanatobenzene, 1,4-bis(isocyanatomethyl)-2,3,5,6-tetrachlorobenzene, 2-dodecyl-1,3-diisocyanatobenzene, 1-isocyanato-4-[(2-isocyanatocyclohexyl)methyl]2-methylbenzene, 1-isocyanato-3-[(4-isocyanatophenyl)methyl]-2-methylbenzene, 4-[(2-isocyanatophenyl)oxy]phenylisocyanate or so may be mentioned. Among said diisocyanate compounds, as mentioned above, it is preferable to use the aliphatic diisocyanate compound or the alicyclic diisocyanate compound.

As a reaction catalyst when synthesizing A2a component, a well-known catalyst can be exemplified. In concrete, for examples of the catalyst, dialkylaminoalkylphenol, trialkylamine, tetraalkylalkylenediamine, tetramethylammonium hydroxide, trimethyl-2-hydroxyethylammonium hydroxide, tetramethylammonium.caprylate, N,N,N-trimethyl, N-2-hydroxypropylammoniumpara tertiarybutyl benzoate, sodium ethylate, sodiumpropionate or so may be mentioned. Although the catalyst concentration varies according to a kind of the used catalyst and its reaction temperature, it is generally selected from 10 ppm to 1% to the raw material of polyisocyanate compound.

Further, process of the reaction can be tracked by measuring isocyanate groups (a ratio of NCO group) in a reaction solution, using an infrared spectrometry or refractometry, and the like.

Excess of a conversion reaction to isocyanurate partly generates a pentamer or a heptamer together with trimer; thus increases a viscosity of the obtained product. Thus, it is preferable to proceed the reaction until a conversion ratio reaches 5 to 70%, preferably 10 to 60%. The reaction is stopped when it reaches a conversion ratio in object by, for example, an addition of a catalyst inactivation such as sulfuric acid, phosphoric acid or so. After a stop of the reaction, and after a removal of the catalyst inactivation when required, the isocyanurate compound (A2a) having an isocyanurate structure and three isocyanate groups in the molecule can be obtained by a removal of an excessive polyisocyanate compound and an organic compound. Further, when a removal of catalyst is required, it can be removed by making a salt after the stop of the reaction and filtering thereof, or it can also be removed dissolving the catalyst in a solvent when reprecipitate after manufacturing "A" component.

(A2b Component: Diisocyanate Compound)

For example of "a diisocyanate compound having two isocyanate groups in the molecule" used as A2b component, an aliphatic diisocyanate compound, an alicyclic diisocyanate compound, an aromatic diisocyanate compound and a mixture thereof can be mentioned. Among these, from the point of the weather resistance, at least a kind of diisocyanate compound selected from the aliphatic diisocyanate compound and the alicyclic diisocyanate compound is preferably used.

A number of isocyanate groups included in a molecule in a diisocyanate compound of A2b component is two. In case when a polyisocyanate compound having three or more isocyanate groups in a molecule is used, there is a tendency that a crosslink density of an available polyurethane resin becomes high and a solubility of the organic solvent decreases.

A diisocyanate compound used as a raw material of the above described A2a component can be preferably used as a diisocyanate compound of A2b component. Among these, from the point of the weather resistance of an available polyurethane resin (an available photochromic composition), at least a kind of diisocyanate compound selected from the aliphatic diisocyanate compound and the alicyclic diisocyanate compound is preferable. As specific examples of preferable compounds, tetramethylene-1,4-diisocyanate, hexamethylene-1,6-diisocyanate, octamethylene-1,8-diisocyanate, 2,2,4-trimethylhexane-1,6-diisocyanate, cyclobutane-1,3-diisocyanate, cyclohexane-1,3-diisocyanate, cyclohexane-1,4-diisocyanate, 2,4-methylcyclohexyldiisocyanate, 2,6-methylcyclohexyldiisocyanate, isophoronediisocyanate, norbornenediisocyanate, isomer mixtures of dicyclohexylmethane-4,4'-diisocyanate, hexahydrotoluene-2,4-diisocyanate, hexahydrotoluene-2,6-diisocyanate, hexahydrophenylene-1,3-diisocyanate, hexahydrophenylene-1,4-diisocyanate or so may be mentioned. These isocyanate compounds may be used alone or by combining two or more thereof.

Further, the diisocyanate compound may be a compound having a structure, providing functionalities of photostability, the antioxidation property or the ultraviolet ray absorbing property or so, in the molecule. Hereinafter, a diisocyanate compound having a piperidine structure exhibiting the photostability is described as an example. For said diisocyanate compound, a reactant of a triisocyanate compound, having three isocyanate groups in the molecule, and a compound, having a group (an amino group, a hydroxyl group, a carboxyl group, a chloride group or a thiol group) capable of reacting with said isocyanate groups in the molecule and having a piperidine structure, can be exemplified. For examples of the triisocyanate compound, 1,3,6-hexamethylene triisocyanate, 1,8-diisocyanato-4-isocyanatomethyloctane, 2-isocyanatoethyl(2,6-diisocyanato)hexanoate, 1-methylbenzene-2,4,6-triisocyanate, diphenylmethane-2,4,4'-triisocyanate, triphenylmethane-4,4',4''-triisocyanate, 1,6,11-undecatriisocyanate or so can be mentioned. In addition, a compound described in the following reaction terminator (A4) having a piperidine structure can be exemplified as a compound having a group, which can react with isocyanate groups in the molecule, and a piperidine structure. With a reaction of an isocyanate group of the triisocyanate compound and a group, capable of reacting with said isocyanate group and included in the below-mentioned A4 component, a compound (diisocyanate compound) having a structure providing functionalities of photostability and the like in the molecule, and having two isocyanate groups in the molecule can be obtained.

Further, as a compound which reacts with the triisocyanate compound, a compound having a group capable of reacting with an isocyanate group in the molecule, and having a hindered phenol structure, a triazine structure, or a benzotriazol structure can be used. With the use of said compound, diisocyanate compound having an antioxidation property or an ultraviolet ray absorbing property can be obtained.

These diisocyanate compounds may be used alone or by combining two or more thereof.

(A Preferable Use of A2 Component)

A2 component, from the point of improving the weather resistance in particular, 30 mass % or more, particularly 50 mass % or more to a total amount of A2a component and A2b component is preferably an isocyanate compound selected from aliphatic isocyanate compounds and alicyclic isocyanate compounds. The most preferable embodiment is that 100 mass % of A2 component is an compound selected from aliphatic isocyanate compounds and alicyclic isocyanate compounds. "A2a component is an isocyanate compound selected from aliphatic isocyanate compounds and alicyclic isocyanate compounds" defines that aliphatic polyisocyanate compounds and alicyclicpolyisocyanate compounds are used as raw materials.

(A3 Component: A Chain Extender)

A chain extender used as A3 component has a group capable of reacting with two or more isocyanate groups in the molecule, and has a molecular weight of 50 to 300. Note that the chain extender is not a polymer; and thus, said molecular weight indicates a molecular weight of the chain extender itself. For examples of the group capable of reacting with the isocyanate group, an amino group (—NH$_2$ or —NH(R)), a hydroxyl group (—OH), a mercapto group (—SH: a thiol group), a carboxyl group (—C(=O)OH), a chloride group [—C(=O)OCl] or so can be mentioned.

A3 component functions as a chain extender when synthesizing "A" component. With the use of A3 component as a chain extender, it becomes possible to control a molecular weight, a heat resistance, a photochromic property or so of "A" component. In case molecular weight of the chain extender is less than 50, an available polyurethane resin tends to be too hard. Further, although the heat resistance of an available photochromic composition improves, the adhesion or the photochromic property tend to decrease. While, in case molecular weight of the chain extender is more than 300, an available polyurethane resin tends to be too soft. Thus, the heat resistance, the adhesion, the photochromic property of the available photochromic composition are all tend to be lowered. Considering above, molecular weight of the chain extender is preferably 50 to 250, and the most preferably 55 to 200.

A3 component is preferably at least a kind of a compound selected from a group consisting of diamine compound, triamine compound, aminoalcohol compound, amino carboxylic acid, aminothiol compound, diol compound, and triol compound or so. Hereinafter, all of diamine compound, triamine compound, aminoalcohol compound, amino carboxylic acid, and aminothiol compound together are may be defined as an amino group containing compound. The amino group containing compound has a group capable of reacting with two or more isocyanate groups in the molecule; and at least one of the group is the amino group (—NH$_2$ or —NH (R): "R" is a substituent group) and a reactive group which react with the isocyanate group other than said amino group is a hydroxyl group (—OH), a mercapto group (—SH: a thiol group) or a carboxyl group [—C(=O)OH].

As the examples of the compound suitably used as the amino group containing compound of A3 component, as diamine compounds and triamine compounds; isophoronediamine, ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, piperazine, N,N-bis-(2-aminoethyl)piperazine, bis-(4-aminocyclohexyl)methane, bis-(4-amino-3-butylcyclohexyl) methane, 1,2-, 1,3- and 1,4-diaminocyclohexane, norbornanediamine, hydrazine, dihydrazine adipate, phenyldiamine, 4,4'-diphenylmethandiamine, N,N'-diethylethylenediamine, N,N'-dimethylethylenediamine, N,N'-dipropylethylenediamine, N,N'-dibutylethylenediamine, N-methylethylenediamine, N-ethylethylenediamine, bis (hexamethylene)triamine, 1,2,5-pentatriamine or so may be mentioned.

Also, as amino alcohol compound, 2-aminoethanol, 3-aminopropanaol, 4-aminobutanol, 5-aminopentanol, 6-amino hexanol, 2-piperidinemethanol, 3-piperidinemethanol, 4-piperidinemethanol, 2-piperidineethanol, 4-piperidineethanol or so may be mentioned.

As for aminocarboxylic acid, glycine, alanine, lysine, leucine or so may be mentioned.

As for aminothiol, 1-aminothiol, 2-aminothiol or so may be mentioned.

As the examples of the compound suitably used as diol compound and triol compound of A3 component, ethyleneglycol, 1,2-propanediol, 1,3-propanediol, 1,2-butanediol, 1,3-butanediol, 1,4-butanediol, 1,3-pentanediol, 2,4-pentanediol, 1,5-pentanediol, 2,2,4-trimethyl-1,3-pentanediol, 2-methyl-1,3-pentanediol, 2,5-hexanediol, 1,6-hexanediol, 2,4-heptanediol, 2-ethyl-1,3-hexanediol, 2,2-dimethyl-1,3-propanediol, 1,8-octancediol, 1,9-nonanediol, 1,10-decanediol, 1,4-cyclohexanediol, 1,4-cyclohexanedimethanol, 1,2-bis (hydroxyethyl)-cyclohexane, diethyleneglycol, triethyleneglycol, tetraethyleneglycol, dipropyleneglycol, tripropyleneglycol, neopentylglycol, trimethylolpropane or so may be mentioned.

The chain extender, such as the amino group containing compound, the diol compound and the triol compound mentioned hereinbefore, may be used alone or by combining two or more thereof.

As for the chain extender, from the point of the heat resistance, the adhesion, and the durability of the photochromic compounds, the amino group containing compounds are preferably used. In particular, it is preferable to use diamine compounds. The reason for this is because by using the amino group containing compound when synthesizing "A" component, the obtained polyurethane resin has the urea bond; thereby the rigidity of the molecule increases and also the hydrogen bond between the molecular chain becomes stronger, thus it is speculated that the heat resistance of photochromic composition is enhanced. Also, in regards with the improvement of the durability of the photochromic compounds, the hydrogen bond between the molecular chain becomes further strong due to the presence of the urea bond; hence the oxygen in the air becomes difficult to disperse into said polyurethane resin; thereby the photooxidized degradation known as the general degradation system of photochromic compounds is thought to be suppressed. Further, regarding the improvement of the adhesive strength, the hydrogen bond between the molecular chain becomes further strong due to the presence of the urea bond; hence the cohesion failure of the resin becomes less likely to happen.

(A4 Component: A Reaction Terminator Having a Group, Capable of Reacting with Isocyanate Groups in the Molecule)

Although "A" component can be obtained by a reaction of the above A1 component, A2 component and A3 component, it can also be obtained by using a reaction terminator (A4), having a group capable of reacting with isocyanate groups in the molecule. "A" component can be made to a non-reactive polyurethane resin, wherein a terminal end of the molecule is capped by a reaction terminator (A4) having one group, capable of reacting with isocyanate groups in the molecule.

A4 component is a reaction terminator having a group capable of reacting with isocyanate groups in the molecule; and with this A4 component, a non-reactive group can be introduced to terminal ends of the polyurethane resin of the present invention. For examples of the above-mentioned group capable of reacting with isocyanate groups, an amino group (—NH$_2$, or —NH(R)), a hydroxyl group (—OH), a mercapto group (—SH: a thiol group), a carboxyl group (—C(=O)OH), a chloride group [—C(=O)OCl] or so can be mentioned.

This reaction terminator has, in a molecule, only one group capable of reacting with the isocyanate group. If two or more of said groups are present in a molecule, "A" component obtained by reacting with A4 component becomes a high molecular weight, and becomes to obtain high viscosity when diluting with the organic solvent; hence it becomes difficult to form the film. Further it tends to lower the adhesion (the adhesion with the optical sheet) of the obtained photochromic adhesive agent.

By introducing said reaction terminator at the terminal end of the polyurethane resin, it becomes possible to control the number average molecular weight of the polyurethane resin, and the adhesion, the heat resistance, and the photochromic characteristic can be easily controlled to the physical properties of the object.

In addition, a compound having the piperidine structure, the hindered phenol structure, the triazine structure, or the benzotriazol structure is preferably used as the reaction terminator. The reason for this is because the piperidine structure, the hindered phenol structure, the triazine structure, or the benzotriazol structure exhibits a photostabilizing effect (the piperidine structure), a antioxidation effect (the hindered phenol structure) or an ultraviolet ray absorbing property (the triazine structure or the benzotriazol structure) respectively. By using the reaction terminator having such structure, the durability (the photo stability, the antioxidation property, the ultraviolet ray absorbing property) of the polyurethane resin itself as "A" component and the photochromic compound can be improved. Among these, in order to improve the durability of the photochromic compound, the compound having the piperidine structure is preferably used.

As a reaction terminator suitably used as A4 component having the piperidine structure, the followings can be exemplified. In concrete, a reaction terminator having the piperidine structure such as 1,2,2,6,6-pentamethyl-4-hydroxypiperidine, 1,2,2,6,6-pentamethyl-4-aminopiperidine, 2,2,6,6-tetramethyl-4-hydroxypiperidine or so in the molecule, and having one group capable of reacting with the isocyanate group can be exemplified. Further, in addition to the above, a reaction terminator having the hindered phenol structure, the triazine structure, or the benzotriazol structure in the molecule, and having one group capable of reacting with the isocyanate group can also be used.

Further, a reaction terminator such as methylamine, ethylamine, propylamine, isopropylamine, butylamine, tert-butylamine can be exemplified as the other A4 component. In general, only one mole of these amine compounds react with one mole of isocyanate groups in a room temperature; and thus it can be a reaction terminator.

The above mentioned A4 component can be introduced into the terminal end of the obtained polyurethane resin. Thus, by introducing A4 component, having a structure providing the weather resistance, into the terminal end instead of the main chain or the side chain, there is an advantage of not damaging intrinsic heat resistance and mechanical strength (a release strength) of the polyurethane resin.

(A Synthesizing Method of "A" Component)

"A" component of the present invention can be obtained by reacting the above A1 component, A2a component, A2b component, and A3 component. Further, when the isocyanate group is left at the terminal end of a reaction product of A1 component, A2a component, A2b component, and A3 component, "A" component can be obtained by reacting with A4 component. In order to obtain the "A" component, the one shot method or the prepolymer method can be used. For instance, "A" component can be suitably obtained by the following method. Urethane prepolymer is obtained by reacting A1 component, A2a component and A2b component, then "A" component of the present is produced by reacting said urethane prepolymer and A3 component, then "A" component of the present invention is produced by reacting said urethane prepolymer and A3 component. Further, when the isocyanate group is left at the terminal end of a reaction product of A1 component, A2a component, A2b component, and A3 component, "A" component can be produced by reacting with a reaction terminator (A4 component) having one group capable of reacting with the isocyanate group in the molecule.

In the above mentioned method, the reaction with A1 component, A2a component and A2b component is carried out under the presence of the solvent or without the presence of the solvent, both in the inert gas atmosphere such as nitrogen or argon at 25 to 120° C. for 0.5 to 24 hours. As for the solvent, the organic solvent such as methylethylketone, diethylketone, toluene, hexane, heptane, ethyl acetate, dimethylformamide (DMF), dimethylsulfoxide (DMSO), tetrahydrofurane (THF) or so may be used. During the reaction, in order to avoid a reaction between the isocyanate group in the A2a component and A2b component and water as impurities, it is preferable that various reaction reagents and solvent are carried out with dehydration treatment in advance to dry sufficiently. Also, when carrying out the above mentioned reaction, the catalyst such as dibutyl tin laurylate, dimethylimidazole, triethylenediamine, tetramethyl-1,6-hexadiamine, tetramethyl-1,2-ethanediamine, 1,4-diazabicyclo[2,2,2]octane or so may be added. The added amount when using the catalyst is preferably 0.001 to 1 parts by mass with respect to total 100 parts by mass of said "A" component.

The reaction between A3 component and the urethane prepolymer obtained as such may be carried out under the presence of solvent or without the solvent, both in the inert gas atmosphere such as nitrogen or argon or so at 25 to 120° C. for 0.5 to 24 hours. As for the solvent, methanol, ethanol, isopropyl alcohol, t-butanol, 2-butanol, n-butanol, methylethylketone, diethylketone, toluene, hexane, heptane, ethyl acetate, DMF, DMSO, THF or so can be used.

In case when a reactive polyurethane resin having isocyanate group at a terminal end of molecular chain, it may be used as it is, however a reaction with A4 component may be carried out under the presence of solvent or without the solvent, both in the inert gas atmosphere such as nitrogen or argon or so at 25 to 120° C. for 0.5 to 24 hours. As for the solvent, methanol, ethanol, isopropyl alcohol, t-butanol, 2-butanol, n-butanol, methylethylketone, diethylketone, toluene, hexane, heptane, ethyl acetate, DMF, DMSO, THF or so can be used.

(A Blending Ratio of Each Component, Characteristic of "A" Component)

The amount ratio of A1 component, A2a component, A2b component, A3 component used for the reaction described in above may be determined accordingly; however from the point of the balance between the heat resistance, the adhesive strength, the photochromic characteristics (the color optical density, the color fading speed, the weather resistance or so) and a solvent resistance of the obtained polyurethane resin, it is preferable to be the following amount ratio. That is, when a total mol numbers of the hydroxyl group included in A1 component is n1, a total mol numbers of isocyanate group included in A2a component is n2a, a total mol numbers of isocyanate group included in A2b component is n2b, and a total mol number of a group capable of reacting with the isocyanate group included in A3 component is n3; it is preferable to satisfy the following ratio. Note that the above mentioned n1, n2a, n2b and n3 can be obtained as a product of used mol number of the compound used for each component, and the number of each group present in one molecule of said compound.

That is, the amount ratio of n1:n2a:n2b:n3=0.30 to 0.90: 0.01 to 0.50:0.50 to 0.99:0.10 to 0.70 (Note n2a+n2b=1 and $0.9 \leq n1+n3 \leq 1.1$) is preferable. Among those, in order for the obtained photochromic composition (a photochromic adhesive agent) to exhibit further excellent adhesion, durability, photochromic property, it is preferably n1:n2a:n2b:n3=0.40 to 0.85:0.02 to 0.30:0.70 to 0.98:0.15 to 0.60 (Note n2a+n2b=1 and $0.9 \leq n1+n3 \leq 1.1$), and more preferably n1:n2a:n2b:n3=0.50 to 0.80:0.03 to 0.15:0.85 to 0.97:0.20 to 0.50 (Note n2a+n2b=1 and $0.9 \leq n1+n3 \leq 1.1$). A total of the above n2a and n2b is always 1.

In this case, when an amount ratio of n2a exceeds 0.5, a crosslink density of the obtained polyurethane resin becomes high; and thus an adhesion or photochromic properties tend to be lowered and it tends to have a high viscosity when dissolved in a solvent. Further, when the same of n2a is less than 0.01, a cross-linking site and an isocyanurate structure in the obtained urethane resin is less; and thus, the adhesion, the heat resistance, the solvent resistance or so tend to be lowered.

When the isocyanate group is left at the terminal end of a reaction product, it can be reacted with a reaction terminator of A4 component. In this case, an amount ratio is preferably as follows. As mentioned above, a total mole number of a group capable of reacting with the isocyanate group included in said A4 component is n4, which is as follows. The n4 can be obtained from used mole number of a reaction terminator.

That is, the amount ratio of n1:n2a:n2b:n3:n4=0.30 to 0.89:0.01 to 0.50:0.50 to 0.99:0.10 to 0.69:0.01 to 0.20 (Note n2a+n2b=1 and $0.9 \leq n1+n3+n4 \leq 1.1$) is preferable. It is preferably n1:n2a:n2b:n3:n4=0.40 to 0.84:0.02 to 0.30:0.70 to 0.98:0.15 to 0.59:0.01 to 0.15 (Note n2a+n2b=1 and $0.9 \leq n1+n3+n4 \leq 1.1$), and more preferably n1:n2a:n2b:n3:n4=0.49 to 0.79:0.03 to 0.15:0.85 to 0.97:0.19 to 0.49:0.02 to 0.10 (Note n2a+n2b=1 and $0.9 \leq n1+n3+n4 \leq 1.1$). A total of the above n2a and n2b is always 1. In addition, it is preferable that n1+n3+n4=1. Note that the amount ratio of n2a is preferably within the above range, due to the same reason when the above reaction terminator is not used.

When the reaction terminator is used, A4 component can be used by a blending amount wherein a total sum of n1, n3 and n4 is larger than that of n2a and n2b (n2a+n2b≤n1+n3+n4), when manufacturing "A" component of a polyurethane resin. In this case, A4 component added excessively may be removed by reprecipitation. Also, in case the excessive A4 component is an amount which does not damage the effect of the present invention, the photochromic composition can be formed as it is. Note, it is preferable to use in an amount ratio of n2a+n2b=n1+n3+n4 when productivity is considered. In addition, an amount ratio of each component constituting "A" component (an isocyanurate polyurethane resin) is preferable to satisfy n2a+n2b=n1+n3+n4.

The polyurethane resin ("A" component) obtained by such reaction may be used as it is dissolved in the reaction solvent; however it may be carried out with the after treatment such as distillation of the solvent if needed, or dropping a reaction liquid to the poor solvent such as water or so thereby precipitate/filter the polyurethane resin followed by drying or so, then it may be used as "A" component.

A molecular weight of "A" component is preferably 5,000 to 150,000, more preferably 8,000 to 100,000, and the most preferably 10,000 to 60,000 from the point of the heat resistance, the adhesive strength, the photochromic characteristics (the color optical density, the color fading speed, the weather resistance or so). Note that, the molecular weight of the above mentioned polyurethane resin refers to the molecular weight in terms of polystyrene oxide measured under the condition of using a gel permeation chromatography (GPC), column: Shodex KD-805, KD-804 (made by SHOWA DENKO K.K.), eluent: LiBr (10 mmol/L)/DMF solution, flow speed: 1 ml/min, detector: R1 detector, polyurethane-urea resin sample solution: 0.5% dimethylformamide (DMF) solution.

Also, a softening point of "A" component is preferably 60 to 200° C. and particularly 80 to 150° C. With the use of a polyurethane resin satisfying the softening point of the above range, processability becomes good when producing a laminated article (a photochromic laminated article) by adhering the optical sheets or films with each other. Further, with the use of said polyurethane resin, processability when manufacturing optical article using the obtained laminated article becomes good. And also processability of coating and curing the hard coat liquid in case of forming the hard coat layer on the surface of these laminated article or optical articles becomes good. Note that, the softening point refers to a softening point measured at the following condition using a thermomechanical analysis (made by SII Nano Technology Inc., TMA 120C). [Measuring condition] Temperature raising speed: 10° C./min, measuring temperature range: 30 to 200° C., probe: probe with needle of tip diameter 0.5 mm.

("B" Component: A Photochromic Compound)

As the photochromic compound used as "B" component in the photochromic composition of the present invention, the known photochromic compounds such as chromene compounds, fulgimide compounds, spirooxazine compounds, spiropyran compounds or so can be used without any limitation. These may be used alone or by combining two or more thereof.

As the above mentioned, fulgimide compounds, spiroxazine compounds, spiropyran compounds, and chromene compounds, for examples the compounds described in JP Patent Application Laid Open No. H02-28154, JP Patent Application Laid Open No. S62-288830, WO94/22850 pamphlet, WO96/14596 or so may be mentioned.

Particularly, as for chromene compounds other than those described in the above listed patent articles, the chromene compound having excellent photochromic characteristics is known and such chromene compounds can be suitably used as "B" component. As such chromene compounds, JP Patent Application Laid Open No. 2001-031670, JP Patent Application Laid Open No. 2001-011067, JP Patent Application Laid Open No. 2001-011066, JP Patent Application Laid Open No. 2000-344761, JP Patent Application Laid Open No. 2000-327675, JP Patent Application Laid Open No. 2000-256347, JP Patent Application Laid Open No. 2000-229976, JP Patent Application Laid Open No. 2000-229975, JP Patent Application Laid Open No. 2000-229974, JP Patent Application Laid Open No. 2000-229973, JP Patent Application Laid Open No. 2000-229972, JP Patent Application Laid Open No. 2000-219678, JP Patent Application Laid Open No. 2000-219686, JP Patent Application Laid Open No. H11-322739, JP Patent Application Laid Open No. H11-286484, JP Patent Application Laid Open No. H11-279171, JP Patent Application Laid Open No. H09-218301, JP Patent Application Laid Open No. H09-124645, JP Patent Application Laid Open No. H08-295690, JP Patent Application Laid Open No. 08-176139, JP Patent Application Laid Open No. H08-157467, U.S. Pat. No. 5,645,767, U.S. Pat. No. 5,658,501, U.S. Pat. No. 5,961,892, U.S. Pat. No. 6,296,785, JP Patent No. 4424981, JP Patent No. 4424962, WO2009/136668 pamphlet, WO2008/023828 pamphlet, JP Patent No. 4369754, JP Patent No. 4301621, JP Patent No. 4256985, WO2007/086532 pamphlet, JP Patent Application Laid Open No. 2009-120536, JP Patent Application Laid Open No. 2009-67754, JP Patent Application Laid Open No. 2009-67680, JP Patent Application Laid Open No. 2009-57300, JP Patent No. 4195615, JP Patent No. 4158881, JP Patent No. 4157245, JP Patent No. 4157239, JP Patent No. 4157227, JP Patent No. 4118458, JP Patent Application Laid Open No. 2008-74832, JP Patent No. 3982770, JP Patent No. 3801386, WO2005/028465 pamphlet, WO2003/042203 pamphlet, JP Patent Application Laid Open No. 2005-289812, JP Patent Application Laid Open No. 2005-289807, JP Patent Application Laid Open No. 2005-112772, JP Patent No. 3522189, WO2002/090342 pamphlet, JP Patent No. 3471073, JP Patent Application Laid Open No. 2003-277381, WO2001/060811 pamphlet, WO00/71544 pamphlet or so are disclosed.

Among these other photochromic compounds, from the point of the photochromic characteristics such as the color optical density, the initial coloring, the durability, the color fading speed or so, it is preferable to use one or more of the chromene compounds having indeno(2,1-f)naphto-(2,1-b) pyran structure. Further, among these chromene compounds, the compounds having the molecular weight of 540 or more is suitable as it exhibits particularly excellent color optical density and color fading speed. The followings are concrete examples thereof.

[Chemical formula 2]

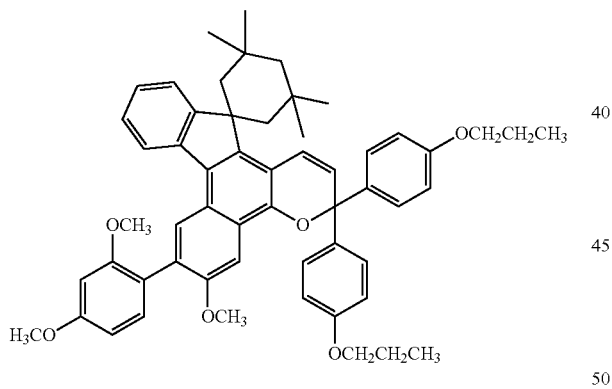

[Chemical formula 3]

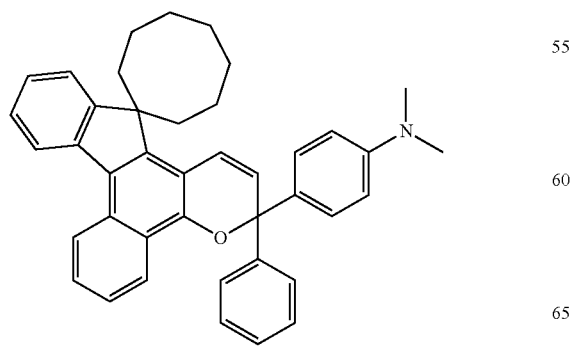

[Chemical formula 4]

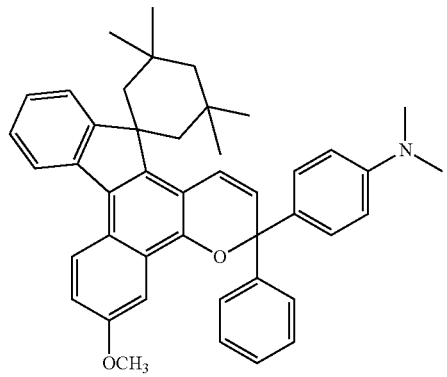

[Chemical formula 5]

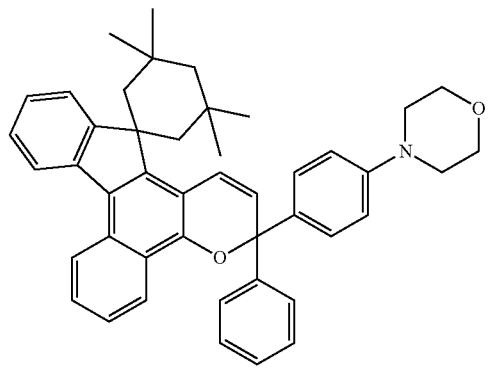

[Chemical formula 6]

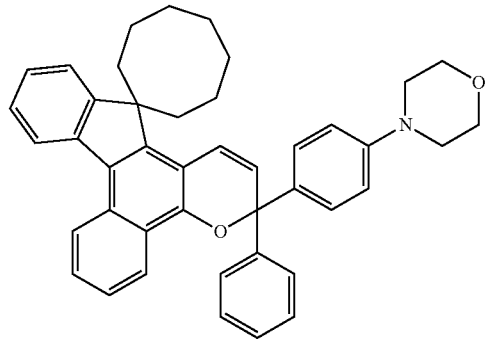

[Chemical formula 7]

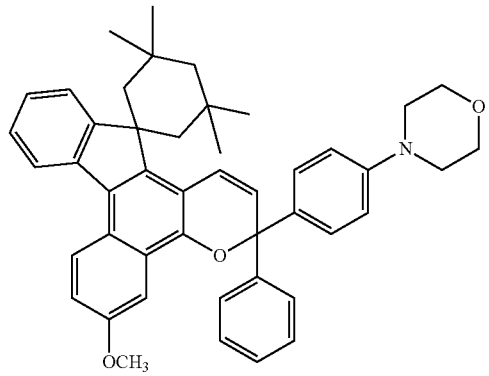

[Chemical formula 8]

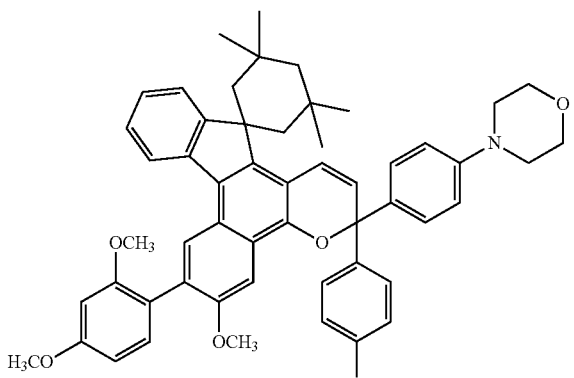

[Chemical formula 9]

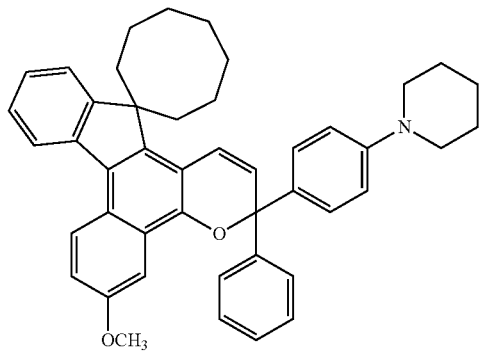

[Chemical formula 10]

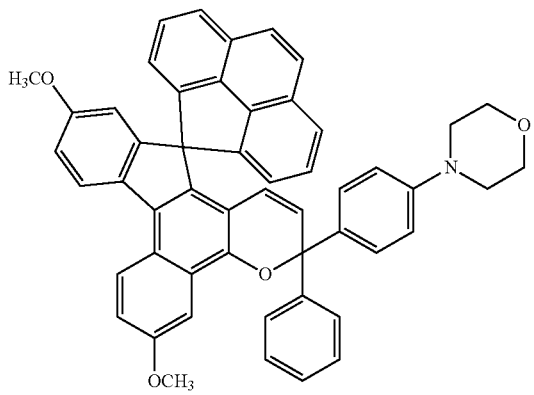

(A Blending Amount of "B" Component)

A blending amount of "B" component in the photochromic composition of the present invention is suitably 0.01 to 20 parts by mass with respect to 100 parts by mass of "A" component from the point of the photochromic characteristic. In case the above mentioned blending amount is too small, sufficient color optical density or durability tends to be difficult to obtain, and when it is too much, although it depends on the type of the photochromic compound, the photochromic compositions becomes difficult to dissolve against "A" component which not only causes the uniformity of the composition to decline, but also the bonding force (the adhesive force) tends to decline. In order to maintain the photochromic characteristics such as the color optical density or the durability or so while sufficiently maintaining the adhesion between the optical base material such as plastic film or so, the added amount of "B" component is preferably 0.5 to 10 parts by mass and more preferably 1 to 5 parts by mass with respect to 100 parts by mass of "A" component.

(The Other Components)

Besides "A" component and "B" component, the photochromic composition of the present invention may include an isocyanate compound having at least one isocyanate group in the molecule (C) (hereinafter, it may be simply referred as "C" component), an organic solvent (D) (hereinafter, it may be simply referred as "D" component), and other components. Hereinafter, these optional components will be explained.

("C" Component: A Isocyanate Compound Having at Least One Isocyanate Group in the Molecule)

By further blending "C" component to the photochromic composition of the present invention, further excellent adhesion and photochromic properties are exhibited.

As said "C" component, a well-known isocyanate compound can be used without any limitation. These may be used alone or by combining two or more thereof.

The reason why excellent adhesion is exhibited by blending "C" component is not clear, however the following reason is thought. A part of the isocyanate group included in "C" component is hydrolyzed by the water included in the photochromic composition of the present invention, or by the moisture in the surrounding environment (that is, under the presence of water); thereby amino group is produced. This amino group formed reacts with the isocyanate group left in "C" component; thereby produces the reaction product having urea bond. The urea group of the reaction product generated here forms the hydrogen bond between the urethane bond and urea bond present in "A" component; thereby it is thought that the aggregation force of the photochromic adhesive layer is improved, and the adhesion and the heat resistance are also improved. Particularly, after being contacted with the hot water, the adhesion (the adhesion between the optical sheet and said adhesive layer) can be highly maintained.

As for the above mentioned isocyanate compound, in addition to the isocyanate compound shown as examples of the above A2a and A2b components, a compound having at least one isocyanate group in a molecule, such as 1-adamantyl isocyanate, propyl isocyanate, isopropyl isocyanate, butyl isocyanate, tert-butyl isocyanate, hexane isocyanate, nonyl isocyanate, dodecyl isocyanate, cyclohexyl isocyanate, 4-methylcyclohexyl isocyanate or so may be mentioned.

Also, the compound having three isocyanate groups in the molecule such as, 1,3,5-tris(6-isocyanatohexyl)biuret, (2,4,6-trioxytriazine-1,3,5(2H,4H,6H)tolyl)tris(hexamethylene) isocyanate or so may be mentioned.

Also, the isocyanate compound (C') (hereinafter, it may be simply referred as C' component) obtained by reacting aforementioned A3 component with the isocyanate compound having two or more isocyanate groups in the molecule can also be used as "C" component of the present invention.

When synthesizing the above mentioned C' component, it is preferably those obtained by reacting diisocyanate compound, which is the aforementioned A2b component, and aminoalcohol compound or diol compound which is the aforementioned A3 component. Said C' component must be present with one or more isocyanate groups in the molecule. Therefore, when synthesizing said C' component, the total mol number of the isocyanate group of A2b component must be larger than the total mol number of the groups capable of reacting with the isocyanate group of A3 component.

The isocyanate group included in said "C" component can be used in the condition being protected by the blocking agent. As for the blocking agent, for example, acid amides, lactams, acid imides, imidazols, ureas, oxime compounds or so may be used. Specifically, acetanilide, acetic acid amide, ε-caprolactam, succinic imides, maleic imides, dimethylpyrazole, thiourea, acetaldoxime, acetoneoxime, methylethylketoxime or so may be mentioned.

The number of the isocyanate group included in "C" component (including C' component) may be one, however it is preferably two or more. By having two or more isocyanate groups in a molecule of "C" component, when forming the photochromic adhesive agent layer, the urea resin (the reaction product of "C" component) having large molecular weight can be formed. As a result, the aggregation force between the reaction product of "C" component and "A" component is improved, thus it is thought that the effect of the improved adhesion is further enhanced. On the other hand, in case four or more isocyanate groups are present in the molecule of "C" component, the urea resin crosslinked in a mesh form is formed, thus the phase separation tends to occur between "A" component which tends to cause the opaque photochromic adhesive layer of the present invention. Therefore, "C" component (including C' component) is a compound preferably having two or three isocyanate groups in the molecule, and more preferably it is a compound having two isocyanate groups.

Also, "C" component is preferably the isocyanate compound selected from the aliphatic isocyanate compounds and alicyclic isocyanate compound from the point of the weather resistance. The aromatic isocyanate compound easily causes the phase separation between "A" component, and tends to cause the opaque photochromic adhesive layer of the present invention. This is thought to be caused since the aromatic isocyanate compound has faster reaction and higher aggregation force than the aliphatic isocyanate compound and the alicyclic isocyanate compound. From the point of this opaqueness, "C" component is preferably the isocyanate compound selected from the aliphatic isocyanate compound and the alicyclic isocyanate compound.

In the present invention, the molecular weight of said "C" component (including said C' component) is not particularly limited, however it is preferably less than 1,000. In case the molecular weight of said "C" component is 1,000 or larger, the heat resistance and film strength of the obtained photochromic adhesive layer tends to decline. It is thought that when the isocyanate compound having high molecular weight is blended, it affects the structural part other than the urea bond in the reaction product of "C" component. Also, if the mol number of the isocyanate group is present more than a specific amount in order to improve the adhesion, the blending amount to "A" component increases for the isocyanate compound having large molecular weight. As a result, the structural part other than the urea bond of said reaction product is thought to be influenced easily. From this point of view, the molecular weight of "C" component is preferably less than 1,000. As described in above, the molecular weight of "C" component is further preferably 750 or less, and the most preferably 600 or less. Obviously, the molecular weight of said C' component is less than 1000 from the same reason. This "C" component (C' component) is preferably not a polymer as mentioned above. Therefore, the molecular weight of said "C" component (C' component) refers the molecular weight of "C" component (C' component) itself. The lower limit of the molecular weight of "C" component is the molecular weight of the monomeric compound, and it is 100 though it is not particularly limited.

(A Blending Amount of "C" Component)

When "C" component is blended, said blending amount is suitably 0.01 to 20 parts by mass with respect to 100 parts by mass of "A" component from the point of the adhesion, the heat resistance and the photochromic characteristics. In case the above blending amount is too little, the effect of improved adhesion and the heat resistance can be obtained sufficiently, and in case it is too much, the adhesive layer obtained from said photochromic composition tends to change opaque, lower the adhesion, and lowers the durability of the photochromic compound. In order to improve the adhesion between the optical sheets or films while maintaining the photochromic characteristics such as the color optical density or the durability, the blending amount of "C" component is 0.1 to 10 parts by mass, more preferably 0.5 to 5 parts by mass with respect to 100 parts by mass of "A" component. Here, the ratio (a mass ratio in terms of a mole number) of the isocyanate group included in "C" component is 0.01 to 10.0 parts by mass, preferably 0.02 to 5.0 parts by mass, and further preferably 0.1 to 3.0 parts by mass with respect to 100 parts by mass of "A" component.

Further, when using "C" component, water can be blended in a photochromic composition. Amount of water suffices, if it is an efficient amount for hydrolysis of "C" component; and it is generally within the range of 0.01 to 5 times mol with respect to the mol number of the isocyanate groups included in "C" component. Also, this water can be substituted by the water (moist) included in the atmosphere when binding the optical sheets or the optical films to each other by the photochromic adhesive sheet.

("D" Component: An Organic Solvent)

By blending an organic solvent to the photochromic composition of the present invention, the isocyanate polyurethane resin ("A" component) and the photochromic compound ("B" component), further the isocyanate compound ("C" component) and the other components added depending on the needs becomes easy to mix; and thus, the uniformity of the photochromic composition can be improved. Further, the viscosity of the photochromic composition of the present invention can be controlled appropriately by using an organic solvent. And the processability and the evenness of the thickness of the coated layer when coating the photochromic composition of the present invention to the optical sheet or film can be further enhanced.

Note that, in case the material easily affected by the organic solvent is used as the optical sheet or film, the appearance may be damaged, or the photochromic characteristic may decline; however such problems can be avoided by applying the following described method of the present invention. Also, regarding the photochromic composition of the present invention, as it will be described in the following, various types of solvent can be used, thus the above mentioned problems can be prevented by using the organic solvent selected from those which barely affects the optical sheet or film as the solvent.

For examples of the organic solvent which can be suitably used as "D" component, alcohols such as methanol, ethanol, n-propanol, i-propanol, n-butanol, t-butanol, 2-butanol or so; polyvalent alcohol derivatives such as ethyleneglycolmonomethylether, ethyleneglycolmonoisopropylether, ethyleneglycolmonoethylether, ethyleneglycolmono-n-propylether, etheyleneglycolmono-n-butylether, ethyleneglycolmono-t-butylether, propyleneglycolmonomethylether, propyleneglycolmonoethylether, propyleneglycol-n-butylether or so; diacetone alcohol; methylethyl ketone; diethylketone; toluene; hexane; heptane; ethyl acetate; dimethylformamide (DMF); dimethylsulfoxide (DMSO); tetrahydrofuran (THF); cyclohexanone or so; and the combinations thereof may be mentioned. Among these, it may be selected accordingly depending on the type of "A" component used or the material of the optical sheet or film.

For example, in case of using the polycarbonate resin as the optical sheet or film and coating the photochromic composition of the present invention directly, alcohols, or polyvalent alcohol derivatives is preferably used as for the solvent.

Considering a smoothness and flatness of the coated layer when the photochromic composition of the present invention is coated on optical sheets or films, or the same of the photochromic adhesive layer (sheet) in case of using the method of the present invention described in the following, the organic solvent is preferably used by mixing the organic solvent having the boiling point of less than 90° C. and the organic solvent having the boiling point of 90° C. or higher. With the use of such combined organic solvent, it is possible to easily remove the organic solvent, and to accelerate the drying speed in addition to the above smoothness and flatness.

The blending ratio of the organic solvent having the boiling point of less than 90° C. and that of 90° C. or higher may be determined accordingly depending on other components used. Among these, in order to exhibit excellent effect, it is preferable that the organic solvent having the boiling point of less than 90° C. is 20 to 80 wt % and the organic solvent having the boiling point of 90° C. or higher is 80 to 20 wt % when whole organic solvent amount is 100 wt %.

Also, in case of adding "D" component, from the point of the effect obtained by adding "D" component as mentioned in above, the added amount is 5 to 900 parts by mass, more preferably 100 to 750 parts by mass, and most preferably 200 to 600 parts by mass with respect to 100 parts by mass of "A" component.

(Components Other than "C" and "D" Components)

Further, in the photochromic composition used for the present invention, for the improvement of the durability of the photochromic compound, the improvement of the color optical density, the improvement of the color fading speed or the film forming property; the surfactant, the antioxidant, the radical capturing agent, the ultraviolet stabilizer, the ultraviolet absorbing agent, the releasing agent, the coloration inhibitor, the anti-static agent, the fluorescent die, the coloring dye, the pigment, the aromatic agent, the plasticizer or so may be added in a range not hindering the effects of the present invention. As for these additives which are blended, the known compounds are used without any limitations.

For example, as the surfactant, any of nonionic, anionic, cationic can be used, however it is preferable to use nonionic surfactants from the point of the solubility to the photochromic compositions. As the specific nonionic surfactant able to be used suitably, sorbitan fatty acid ester, glycerin fatty acid ester, decaglycerin fatty acid ester, propylene glycol/pentaerythritol fatty acid ester, polyoxyethylene sorbitan fatty acid ester, polyoxyethylenesorbitan fatty acid ester, polyoxyethyleneglycerin fatty acid ester, polyethyleneglycol fatty acid ester, polyoxyethylenealkylether, polyoxyethylenephytosterol/phiytostanol, polyoxyethylenepolyoxypropylenealkylether, polyoxyethylenealkylphenylether, polyoxyethylene caster oil/curable caster oil, polyoxyethylenelanoline/lanorine alcohol/beeswax derivatives, polyoxyethylenealkylamine/fatty acid amine, polyoxyethylenealkylphenylformaldehyde condensation product, single chain polyoxyethylenealkylether, and further the surfactant of silicones or fluorine can be mentioned. For the use of the surfactant, it may be used by mixing two or more thereof. The added amount of the surfactant is preferably within the range of 0.001 to 1 part by mass with respect to 100 parts by mass of the polyurethane resin ("A" component).

Also, as the antioxidant, the radical capturing agent, the ultraviolet stabilizer, and the ultraviolet absorbing agent, the hindered amine photo stabilizer, the hindered phenol antioxidant, the phenol radical capturing agent, the sulfur antioxidant, the phosphorous antioxidant, the triazine compounds, the benzotriazol compounds, the benzophenone compounds or so can be suitably used. These antioxidant, radical capturing agent, ultraviolet stabilizer, ultraviolet absorbing agent may be used by combining two or more thereof. Further, for the use of these additives, the antioxidant, the radical capturing agent, the ultraviolet stabilizer and the ultraviolet absorbing agent, and the surfactant may be used together. The added amount of these antioxidant, radical capturing agent, ultraviolet stabilizer, ultraviolet absorbing agent is preferably within the range of 0.001 to 20 parts by mass with respect to 100 parts by mass of the polyurethane resin ("A" component). Note that, if these additives are used too much, the adhesion of the photochromic composition to the optical sheet or film made of polycarbonate resin declines, thus the added amount is preferably 7 parts by mass or less, more preferably 3 parts by mass or less, and most preferably 1 part by mass or less.

In addition, a pressure-sensitive adhesive agent may be blended in the photochromic composition of the present invention in order to improve an adhesion of photochromic adhesive sheets and optical sheets. In concrete, terpene resin, terpene phenol resin, phenol resin, a hydrogenated terpene resin, rosin resin, xylene resin, acrylic pressure-sensitive adhesive agent, silicone pressure-sensitive adhesive agent, urethane pressure-sensitive adhesive agent or so can be exemplified. In addition, an inorganic oxide microparticle, an organic/inorganic complex material or so may be blended to the photochromic composition in order to improve the heat resistance of the photochromic adhesive sheet and to lower the solubility to a polymerizable monomer. For examples of an inorganic oxide microparticle, metal oxide sol such as silica sol dispersed in an organic solvent, such as methanol, methylethylketone, propyleneglycolmonomethylether or so can be mentioned; and for examples of an organic/inorganic hybrid material, silica/melaminehybrid material, silica/urethane hybrid material, silica/acrylic hybrid material, silica/epoxy resin hybrid material or so can be mentioned.

(A Production Method of Photochromic Composition)

The photochromic composition of the present invention can be produced by mixing above mentioned "A" component and "B" component, and when required, "C" component, "D" component and the other components. The order of mixing of each component is not particularly limited.

For example, in case of not using the organic solvent, each component can be melt kneaded and the photochromic composition can be made into a pellet, and also it can be sheet molded. Also, in case of using the organic solvent, the photochromic composition can be obtained by dissolving each component to the organic solvent.

The photochromic composition of the present invention obtained as such can be suitably used as the photochromic adhesive agent for adhering the optical sheet or film made of photochromic adhesive agent. Further, by binding the optical sheets or films with each other via the adhesive layer made of the photochromic composition of the present invention, the below mentioned optical article can be obtained. Hereinafter, the optical article and the production method according to the present invention will be described.

Note, when binding optical sheets or optical films using a photochromic composition, to which "C" component of the present invention is added, it is preferably bound under the presence of water (under the presence of a moist).

(An Optical Article of the Present Invention)

The optical article of the present invention has a multilayer structure wherein two optical sheets or films opposing each other are bound via the adhesive layer made of the photochromic composition of the present invention. As for such optical article; a photochromic multilayer sheet or film formed only by the above mentioned multilayer structure (hereinafter, it may be simply referred as a photochromic laminated article); a complex laminated article, wherein optical sheets or films are further laminated to said photochromic laminated article or a coat layer is formed on a surface of hard coat layer; and an optical article wherein the optical base material such as plastic lens body or so are made one body with the above mentioned photochromic laminated article or a complex laminated article or so may be exemplified. As for the method for making as one body with the optical base material such as the plastic lens or so, for example, the method of injection molding the thermoplastic resin for constituting the optical base material (for example, the lens body) such as polycarbonate resin or so after installing the above photochromic laminated article in the metal mold (hereinafter it may be simply referred as the injection molding method), the method of pasting the above photochromic laminated article or so by the adhesive agent to the surface of the optical base material, or the method of polymerizing the polymerizable monomer by embedding the photochromic laminated article in the polymerizable monomer, or so may be mentioned. Hereinbelow, these material or the parts constituting the optical article of the present invention will be explained.

(An Optical Sheet or Film)

In the present invention, as the optical sheet or film, the sheet or the film having the optical transparency can be used without particular limitation; however, it is suitable to use those made of resin as it is easy to obtain and easy to process. As examples of the resins as the material of the optical sheet or film, polycarbonate resin, polyethylenetelephthalate resin, nylon resin, triacetylcellulose resin, acrylic resin, urethane resin, allyl resin, epoxy resin, polyvinyl resin or so may be mentioned. Among these, polycarbonate resin is particularly preferable since it has good adhesion and high applicability against the injection molding. Also, the polarizing film (those which the polyvinyl alcohol polarizing film being sandwiched between the triacetylcellulose resin film) can be used as the optical film of the present invention.

Two optical sheets facing each other according to the present invention may be a sheet made of the same or the different resins.

Although a thickness of the optical sheets or the optical films are not particularly limited; it is generally 50 µm to 1 mm and preferably 0.1 mm to 0.5 mm. In case thinner than 50 µm, a strain may be generated on the optical sheets or films when curing in a state wherein said optical sheets or films are embedded in a polymerizable monomer which is a base material. While in case when a thickness of the optical sheets or films exceeds 1 mm, an available photochromic lens become thick and machining a curved surface may become difficult.

The optical sheets or the optical films used in the present invention may be reformed by a known method. For instance, in order to further improve an adhesion by the above described photochromic composition, a surface reformed optical sheets or films may be used. The reform method is not particularly limited; and plasma discharge treatment, corona treatment, flame treatment, chemical treatment by acid or alkaline chemical or so, and the like maybe exemplified. In addition, in order to improve the adhesion and to provide the other functions, optical sheets or films, having multilayer sheets or films, or the same having a coated layer can be used.

(A Production Method of the Photochromic Laminated Article)

According to the present invention, the photochromic laminated article is produced by binding two optical sheets or films facing each other via the adhesive layer (also called as a photochromic adhesive layer) consisting of the photochromic composition of the present invention. Thickness of the above adhesive layer is 5 to 100 µm; more preferably it is 10 to 50 µm from the point of the color optical density, the weather resistance and the adhesive strength of the photochromic compound.

The above mentioned adhesive layer can be obtained from the following method depending on the property of the photochromic composition used. That is, in case the photochromic composition of the present invention is controlled to a suitable viscosity by adding the solvent or so, to the one of the optical sheet or film the photochromic composition of the present invention is coated, and after carrying out the drying (heating) if needed, other optical sheet or film may be (heat) pressure adhered. Here, as for the coating method of the photochromic composition, the known methods such as a spin coat method, a spray coat method, a dip coat method, a dip spin coat method, a dry lamination method or so can be used without any limitation. The coating and the drying of the above mentioned photochromic composition is preferably carried out at the temperature of a room temperature to 100° C., the humidity of 10 to 100% RH. That is, in case "C" component is present, by carrying out the drying under this condition, the hydrolysis of "C" component is promoted, and further strong adhesive force can be obtained.

Also, in case of using the photochromic composition of the present invention including the organic solvent, (D) organic solvent is removed by drying after extending the photochromic composition of the present invention on a flat and smooth base material; and the photochromic laminated article can be produced with the methods including a step of preparing a photochromic adhesive sheet comprising a polyurethane resin (A) having an isocyanurate structure and a photochromic compound (B) and a step of forming said multilayer structure by binding two optical sheets or films by placing said photochromic adhesive sheet in between two optical sheets or films facing each other.

In addition, in view of improving adhesion, an isocyanate compound (C) component having at least one isocyanate group in it molecule is preferably blended in the photochromic composition of the present invention. In this case, photochromic laminated article of the invention is manufactured as is the same with above. In this case, when a preparing step of the photochromic adhesive sheet and the photochromic laminated article is performed under water (moist), the photochromic adhesive sheet and the above isocyanate compound (C) included in the photochromic laminated article is partly a reaction product.

In a case when the above methods are used, a material of the above smooth base material is preferable to be resistant to the solvents used in the invention, and to which polyurethane resin of the invention is releasable; and for a specific example, plastic films, to which a coat layer of glass, stainless, polytetrafluoroethylene, polyethylene terephthalate, polyethylene, polypropylene, further, silicon or fluorin series or so is laminated in order to improve release property, and the like may be mentioned.

In case of employing such method, regardless of the type of the solvent and the type of the optical sheet or film, the adverse effect caused by the use of the solvent can be eliminated.

The photochromic laminated article obtained at the step of binding said optical sheets or optical films, it may be used as it is, however it can be used by stabilizing the condition thereof by the following method. Specifically, it is preferable to leave the laminated article just bound at the temperature of 20° C. or higher and 60° C. or less for 12 hours or longer. The upper limit for the time for leaving is not particularly limited, however, 50 hours or so is sufficient. Also it can be left at normal pressure, or it can be left under vacuumed condition. Further, this multilayer sheet being left is preferably left at the temperature of 80° C. or higher and 130° C. or less for 30 minutes to 3 hours (hereinafter, it will be considered as the heat treatment). The photochromic laminated article obtained by this heat treatment will have a very stable condition. Also, in case of using this isocyanate compound (C), it is preferably treated at a temperature of 20 to 100° C. and under the humidity of 40 to 100% RH, in order to completely eliminate the isocyanate group left in the above photochromic laminated article. Further, after the humidify treatment, by leaving under normal pressure or under vacuumed condition at 40 to 130° C., the excessive water present in the laminated article can be removed.

On the other hand, the following methods can be used when using the photochromic composition not including the organic solvent. For instance, a method wherein the photochromic adhesive sheet is laminated on an optical sheet or film by extrusion molding, and then an optical sheet or film is laminated on said photochromic adhesive sheet can be used. Further, a method wherein optical sheets or films are laminated on both sides of photochromic adhesive sheet by co-extrusion molding can also be used. In case when the photochromic adhesive sheet obtained as above is used, it is preferable to set a leaving time, as is the same with the above method, and to perform a heat treatment.

According to the above methods, the photochromic laminated article can be produced. Although this photochromic laminated article can be used as it is, it can be applied to a production method of a photochromic lens by an injection molding and thermocompression and to the same by embedding in a polymerizable monomer.

(Examples for Using a Photochromic Laminated Article (A Photochromic Lens))

The above mentioned photochromic laminated article is used preferably by binding an optical base material on at least one surface thereof. As said optical base material, the above thermoplastic resin such as polycarbonate resin can be exemplified. In this case, a thermoplastic resin can be laminated on a photochromic laminated article by an injection molding and thermocompression. According to the photochromic adhesive sheet comprising the photochromic composition of the invention, adhesion and heat resistance are improved; and thus, it is preferably used when manufacturing photochromic lens with such method.

Further, the above mentioned photochromic laminated article is embedded in a polymerizable monomer; and by curing the polymerizable monomer, a thermosetting resin can be laminated on the laminated article. For examples of the polymerizable monomer, (meth)acrylate monomer composition, allylic monomer composition, thiourethane monomer composition, urethane monomer composition, thioepoxy monomer composition or so, which can form the thermosetting resin, are mentioned photochromic adhesive sheet made of the photochromic composition of the present invention has an improved the solvent resistance; and thus, it is preferably used when manufacturing the photochromic lens with such method.

EXAMPLE

Hereinafter, the present invention will be described in further detail, by using the examples. These examples are to simply describe the present invention, and the scope and the spirit of the present invention is not to be limited to these examples. Hereinafter, the abbreviation of the compounds or so used as each component in the examples and the comparative examples are listed.

(A1 Component; A Polyol Compound)

PL1: "DURANOL™" made by Asahi Kasei Chemicals Corporation (polycarbonate diol having 1,5-pentane diol and hexane diol as a raw material, the number average molecular weight 800)

PL2: "PRACCEL™" made by DAICEL CORPORATION (polycaprolactonediol, the number average molecular weight 830)

PL3: polypropylenediol made by ASAHI GLASS CO., LTD (the number average molecular weight 700)

(A2a Component; An Isocyanurate Compound)

Synthesizing an Isocyanurate Compound (N1)

1,000 g of isophorone diisocyanate as a diisocyanate monomer were added into a four-necked flask having a thermometer, a stirring blade, and a nitrogen shield pipe, air in the flask was substituted by nitrogen, and then heated thereof at 60° C. while stirred. 0.26 g of tetramethylammonium.caprylate was divided and added as a trimerization catalyst. The reaction was proceeded at 60° C. and 0.66 g of phosphoric acid was added when NCO content became 40%. From the reaction liquid, unreacted hexamethylendiisocyanate was removed and collected using a molecular distillation apparatus, and N1 (a compound shown by the following formula (N1)) was obtained. NCO content of the obtained N1 was 18.5% (a theoretical value: 18.9%). Note NCO content during reaction and the obtained NCO content were obtained by titration below. First, n-butylamine of known concentration is added to the reaction system or the obtained N1 in an excessive amount, compared to the included NCO group. n-butylamine was partly consumed by reacting with NCO group. NCO group content was obtained by obtaining a consumed amount of n-butylamine when titrating a system to which n-butylamine was blended (Consumption amounts of n-butylamine and NCO group were the same.).

[Chemical formula 11]

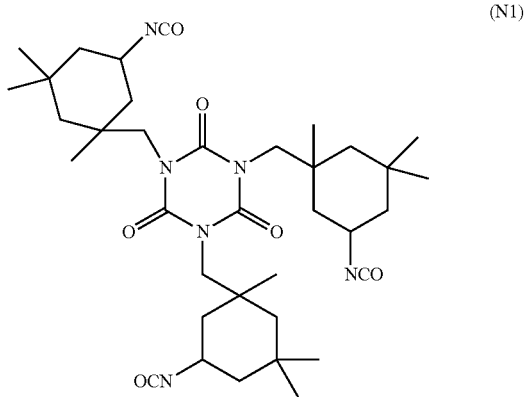

(N1)

Synthesis of Isocyanurate Compound (N2)

Except for using 1,000 g of hexamethylendiisocyanate, 0.2 g of tetramethylammonium.caprylate and 0.5 g of phosphoric acid, the reaction was carried out as same as the synthesizing method of N1; and N2 (a compound shown below) was obtained. NCO content of the obtained N2 was 24.5% (the theoretical value: 25.0%).

[Chemical formula 12]

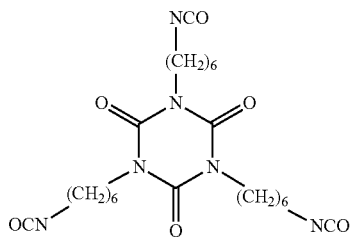

(N2)

Synthesis of Isocyanurate Compound (N3)

Except for using 1,000 g of isomer mixtures of dicyclohexylmethane 4,4'-diisocyanate, 0.3 g of tetramethylammonium.caprylate, and 0.75 g of phosphoric acid, the reaction was carried out as same as the synthesizing method of N1; and N3 (a compound shown below) was obtained. NCO content of the obtained N3 was 15.2% (the theoretical value: 16.0%).

[Chemical formula 13]

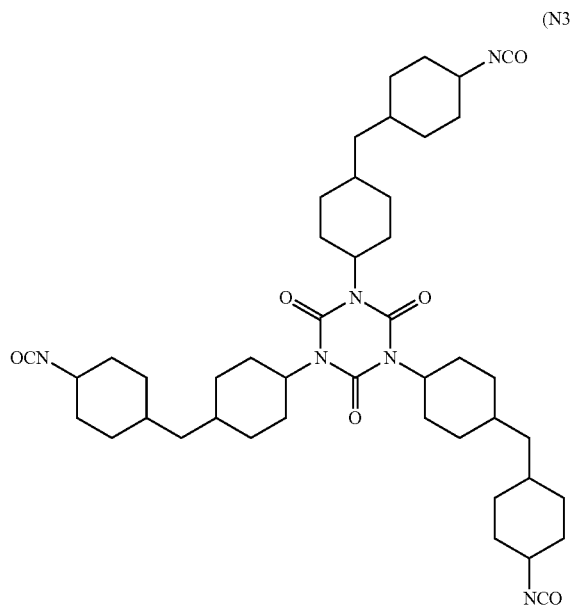

(N3)

A2b component; diisocyanate compound

NCO1: isophorone diisocyanate

NCO2: 1,3,6-hexamethylene triisocyanate

NCO3: isomer mixtures of dicyclohexylmethane 4,4'-diisocyanate

NCO4: toluene-2,4-diisocyanate

A3 component; a chain extender

CE1: isophorone diamine

CE2: bis-(4-aminocyclohexyl)methane

A4 component; a reaction terminator

S1: 1,2,2,6,6-pentamethyl-4-aminopiperidine

"B" component; a photochromic compound

PC1: a compound shown by the following formula

[Chemical formula 14]

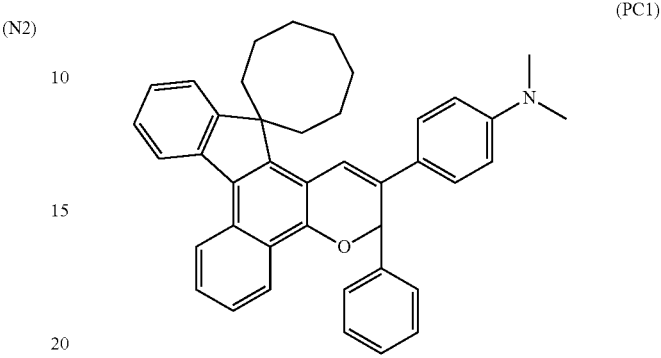

(PC1)

"C" component; an isocyanate compound

C1: isophorone diisocyanate (a molecular weight of 222)

"D" component; an organic solvent

D1: tetrahydrofuran (A Synthetic Example of "A" Component)

("A" Component; Synthesis of the Isocyanurate Polyurethane Resin (U1))

252 g of polyol compound (PL1: polycarbonate diol) having the number average molecular weight of 800, 70 g of an isocyanurate compound (N1) to which isophorone diisocyanate was trimerized, and 65 g of isophorone diisocyanate (NCO1) were added into a three-necked flask having a stirring blade, a cooling pipe, a thermometer, and nitrogen gas introducing pipe; and reacted under nitrogen atmosphere at 80° C. for 9 hours; thereby a prepolymer was obtained. Subsequently, after adding 1,600 ml of N,N-dimethylformamide, 18.7 g of isophorone diamine (CE1) was added by drop under nitrogen atmosphere; and reacted for 1 hour at 25° C. after the drop, followed by removing the solvent under the reduced pressure; thereby the isocyanurate polyurethane resin (U1) was synthesized. The molecular weight of the obtained isocyanurate polyurethane resin was 58,000 (the theoretical value: 55,000) in terms of polyoxyethylene, and the softening point was 150° C.

("A" Component: Synthesis of the Isocyanurate Polyurethane Resin (U2 to U6, U19 and U20))

U2 to U6, U19 and U20 were synthesized by the same method as the synthetic method of above U1, except for using the polyol compound (A1 component), the isocyanurate compound (A2a component), the diisocyanate compound (A2b component), the chain extender (A3 component) and the reaction solvent shown in Table 1; and the reaction condition shown in Table 1. Synthesis condition of the obtained polyurethane resin is also shown in Table 1.

("A" Component: Synthesis of the Isocyanurate Polyurethane Resin (U7))

252 g of polyol compound (PL1: polycarbonate diol) having the number average molecular weight of 800, 70 g of an isocyanurate compound (N1) to which isophorone diisocyanate was trimerized, and 65 g of isophorone diisocyanate (NCO1) were added into a three-necked flask having a stirring blade, a cooling pipe, a thermometer, and nitrogen gas introducing pipe; and reacted under nitrogen atmosphere at 80° C. for 9 hours; thereby a prepolymer was obtained. Subsequently, after adding 1,600 ml of N,N-dimethylformamide, 18.7 g of isophorone diamine (CE1) was added by drop under nitrogen atmosphere; and reacted for 1 hour at 25° C. after the drop; thereby the isocyanurate polyurethane resin having isocyanate group at a terminal end of molecular chain was obtained.

Subsequently, 8 g of 1,2,2,6,6-pentamethyl-1-4-aminopiperidine (S1) was added to the above solution under nitrogen atmosphere; and reacted for 1 hour at 25° C.; followed by removing the solvent under the reduced pressure; thereby the polyurethane resin having piperidine ring at a terminal end of urethane resin was obtained. The molecular weight of the obtained polyurethane resin was 57,000 (the theoretical value: 55,000) in terms of polyoxyethylene, and the softening point was 150° C.

("A" Component: Synthesis of the Isocyanurate Polyurethane Resin (U8 to U18 and U23))

U8 to U18 and U23 were synthesized by the same method as the synthetic method of above U7, except for using the polyol compound (A1 component), the isocyanurate compound (A2a component), the diisocyanate compound (A2b component), the chain extender (A3 component) the reaction terminator (A4 component) and the reaction solvent shown in Table 1; and the reaction condition shown in Table 1. Synthesis condition of the obtained polyurethane resin is also shown in Table 1.

TABLE 1

| Polyurethane resin | A1 Type | A1 Added amount (g) | A2a Type | A2a Added amount (g) | A2b Type | A2b Added amount (g) | Reaction condition Temp. (° C.) | Reaction condition Time (hour) | Diluting solvent Type | Diluting solvent Added amount (g) |
|---|---|---|---|---|---|---|---|---|---|---|
| U1 | PL1 | 252 | N1 | 70 | NCO1 | 65 | 80 | 9 | DMF | 1600 |
| U2 | PL1 | 252 | N1 | 2 | NCO1 | 99 | 80 | 9 | THF | 1500 |
| U3 | PL1 | 252 | N1 | 40 | NCO1 | 80 | 80 | 9 | DMF | 1600 |
| U4 | PL1 | 252 | N1 | 4 | NCO1 | 98 | 80 | 9 | THF | 1500 |
| U5 | PL1 | 252 | N1 | 20 | NCO1 | 90 | 80 | 9 | DMF | 1500 |
| U6 | PL1 | 252 | N1 | 8 | NCO1 | 96 | 80 | 9 | DMF | 1500 |
| U7 | PL1 | 252 | N1 | 70 | NCO1 | 65 | 80 | 9 | DMF | 1600 |
| U8 | PL1 | 252 | N1 | 2 | NCO1 | 99 | 80 | 9 | THF | 1500 |
| U9 | PL1 | 252 | N1 | 40 | NCO1 | 80 | 80 | 9 | DMF | 1600 |
| U10 | PL1 | 252 | N1 | 4 | NCO1 | 98 | 80 | 9 | THF | 1500 |
| U11 | PL1 | 252 | N1 | 20 | NCO1 | 90 | 80 | 9 | DMF | 1500 |
| U12 | PL1 | 252 | N1 | 8 | NCO1 | 96 | 80 | 9 | DMF | 1500 |
| U13 | PL1 | 252 | N2 | 6.1 | NCO1 | 96 | 80 | 9 | DMF | 1500 |
| U14 | PL1 | 252 | N3 | 9.4 | NCO1 | 96 | 80 | 9 | DMF | 1500 |
| U15 | PL1 | 288 | N1 | 8 | NCO3 | 113 | 80 | 9 | DMF | 1700 |
| U16 | PL2 | 299 | N1 | 8 | NCO1 | 96 | 80 | 9 | DMF | 1700 |
| U17 | PL2 | 224 | N1 | 20 | NCO3 | 106 | 80 | 9 | DMF | 1500 |
| U18 | PL1 | 252 | N1 | 120 | NCO1 | 40 | 80 | 9 | DMF | 1600 |
| U19 | PL1 | 252 | — | — | NCO1 | 100 | 80 | 9 | THF | 1500 |
| U20 | PL1 | 252 | — | — | NCO1/NCO2 | 96/2.5 | 80 | 9 | DMF | 1500 |
| U21-a | PL3 | 211 | — | — | NCO3 | 118 | 80 | 9 | — | — |
| U21-b | PL3 | 241 | — | — | NCO4 | 30 | 80 | 9 | — | — |
| U22-a | PL1 | 289 | — | — | NCO1 | 120 | 80 | 9 | — | — |
| U22-b | PL1 | 276 | — | — | NCO4 | 30 | 80 | 9 | — | — |
| U23 | PL1 | 252 | N2 | 6.1 | NCO1 | 96 | 80 | 9 | DMF | 1500 |

| Polyurethane resin | Chain extender A3 Type | Chain extender A3 Added amount (g) | Chain extender reaction condition Temp. (° C.) | Chain extender reaction condition Time (hour) | Reaction terminator A4 Type | Reaction terminator A4 Added amount (g) | Reaction terminator reaction condition Temp. (° C.) | Reaction terminator reaction condition Time (hour) |
|---|---|---|---|---|---|---|---|---|
| U1 | CE1 | 18.7 | 25 | 1 | — | — | — | — |
| U2 | CE1 | 18.7 | 25 | 1 | — | — | — | — |
| U3 | CE1 | 18.7 | 25 | 1 | — | — | — | — |
| U4 | CE1 | 18.7 | 25 | 1 | — | — | — | — |
| U5 | CE1 | 18.7 | 25 | 1 | — | — | — | — |
| U6 | CE1 | 18.7 | 25 | 1 | — | — | — | — |
| U7 | CE1 | 18.7 | 25 | 1 | S1 | 8 | 25 | 1 |
| U8 | CE1 | 18.7 | 25 | 1 | S1 | 8 | 25 | 1 |
| U9 | CE1 | 18.7 | 25 | 1 | S1 | 8 | 25 | 1 |
| U10 | CE1 | 18.7 | 25 | 1 | S1 | 8 | 25 | 1 |
| U11 | CE1 | 18.7 | 25 | 1 | S1 | 8 | 25 | 1 |
| U12 | CE1 | 18.7 | 25 | 1 | S1 | 8 | 25 | 1 |
| U13 | CE1 | 18.7 | 25 | 1 | S1 | 8 | 25 | 1 |
| U14 | CE1 | 18.7 | 25 | 1 | S1 | 8 | 25 | 1 |
| U15 | CE1 | 11.2 | 25 | 1 | S1 | 8 | 25 | 1 |

TABLE 1-continued

| | | | | | | | | |
|---|---|---|---|---|---|---|---|---|
| U16 | CE1 | 11.2 | 25 | 1 | S1 | 8 | 25 | 1 |
| U17 | CE1 | 46 | 25 | 1 | S1 | 15 | 25 | 1 |
| U18 | CE1 | 18.7 | 25 | 1 | S1 | 8 | 25 | 1 |
| U19 | CE1 | 18.7 | 25 | — | — | — | — | — |
| U20 | CE1 | 18.7 | 25 | — | — | — | — | — |
| U21-a | — | — | — | — | — | — | — | — |
| U21-b | — | — | — | — | — | — | — | — |
| U22-a | — | — | — | — | — | — | — | — |
| U22-b | — | — | — | — | — | — | — | — |
| U23 | CE2 | 22.1 | 25 | 1 | S1 | 8 | 25 | 1 |

The above mentioned results of the blending ratio, the molecular weight, the softening point of A1, A2a, A2b, A3 and A4 components of the obtained polyurethane resin U1 to U20 and U23 are listed in Table 2.

TABLE 2

| Poly-urethane resin | Blending ratio A1/A2a/A2b/A3/A4 | Molecular weight in terms of polyoxyethylene | Molecular weight theoretical value | Softening point (° C.) |
|---|---|---|---|---|
| U1 | 0.7/0.35/0.65/0.25/0 | 58,000 | 55,000 | 150 |
| U2 | 0.7/0.01/0.99/0.25/0 | 19,000 | 18,000 | 90 |
| U3 | 0.7/0.2/0.8/0.25/0 | 52,000 | 50,000 | 140 |
| U4 | 0.7/0.02/0.98/0.25/0 | 22,000 | 20,000 | 110 |
| U5 | 0.7/0.1/0.9/0.25/0 | 45,000 | 42,000 | 135 |
| U6 | 0.7/0.04/0.96/0.25/0 | 28,000 | 26,000 | 135 |
| U7 | 0.7/0.35/0.65/0.25/0.05 | 57,000 | 55,000 | 150 |
| U8 | 0.7/0.01/0.99/0.25/0.05 | 18,000 | 18,000 | 90 |
| U9 | 0.7/0.2/0.8/0.25/0.05 | 51,000 | 50,000 | 140 |
| U10 | 0.7/0.02/0.98/0.25/0.05 | 21,000 | 20,000 | 110 |
| U11 | 0.7/0.1/0.9/0.25/0.05 | 43,000 | 42,000 | 135 |
| U12 | 0.7/0.04/0.96/0.25/0.05 | 27,000 | 26,000 | 135 |
| U13 | 0.7/0.04/0.96/0.25/0.05 | 24,000 | 24,000 | 130 |
| U14 | 0.7/0.04/0.96/0.25/0.05 | 35,000 | 35,000 | 140 |
| U15 | 0.8/0.04/0.96/0.15/0.05 | 30,000 | 30,000 | 125 |
| U16 | 0.8/0.04/0.96/0.15/0.05 | 31,000 | 31,000 | 125 |
| U17 | 0.6/0.1/0.9/0.3/0.1 | 23,000 | 22,000 | 140 |
| U18 | 0.7/0.6/0.4/0.25/0.05 | 62,000 | 60,000 | 170 |
| U19 | 0.7/0/1/0.25/0 | 17,000 | 16,000 | 75 |
| U20* | 0.7/0/1/0.25/0 | 27,000 | 26,000 | 100 |
| U21-a | 0.67/0/1/0/0 | 2,200 | 2,200 | — |
| U21-b | 1/0/0.5/0/0 | 1,600 | 1,600 | — |
| U22-a | 0.67/0/1/0/0 | 2,300 | 2,300 | — |
| U22-b | 1/0/0.5/0/0 | 1,800 | 1,800 | — |
| U23 | 0.7/0.04/0.96/0.25/0.05 | 27,000 | 25,000 | 140 |

*The blending ratio of A2b in U20 is isophorone disiocyanate/1,3,6-hexamethylene triisocyanate = 0.96/0.04, not including isocyanurate compound Example 1

(A Preparation of the Photochromic Composition)

To 5 g of the isocyanurate polyurethane resin (U1), 36 g of tetrahydrofuran as the organic solvent was added; then stirred at 80° C., and dissolved by ultrasonic wave. After the polyurethane resin was confirmed being dissolved, it was cooled to the room temperature, 0.25 g of the photochromic compound (PC1) was added and mix stirred to obtain the photochromic composition. Softening point of the obtained photochromic composition was measured by the following method, and was 150° C.

[An Evaluation Item; A Photochromic Composition]
(The Softening Point)

The obtained photochromic composition was poured into a stainless container, dried at 40° C. for 10 hours, 60° C. for 10 hours, and further by a vacuum dryer, 60° C. for 12 hours; thereby producing a sample peace having a thickness of 1 mm. Softening point of the obtained sample peace was measured using the thermomechanical analysis (made by SII Nano Technology Inc., TMA 120C) at temperature raising speed: 10° C./min, measuring temperature range: 30 to 200° C. and probe: probe with needle of tip diameter 0.5 mm.

(Production of the Photochromic Laminated Article (the Optical Article))

The obtained photochromic composition was coated to the PET film "Purex™" with silicone coating film made by Teijin DuPont Films Japan Limited.), in the experiment room under the presence of the moist (23° C., relative humidity of 50%), it was dried for 30 minutes at 50° C.; then the obtained photochromic adhesive sheet having the thickness of 40 μm was obtained. Then, the obtained photochromic adhesive sheet was placed between two polycarbonate sheets having the thickness of 400 μm, and further left for 24 hours at 40° C., and further heated for 60 min. at 110° C. to obtain the laminated article having the photochromic characteristic of subject.

The obtained photochromic laminated article was evaluated according to the method below, the initial release strength was 75 N/25 mm, and after the boiling test it was 60 N/25 mm. Further, the solvent resistance of either polymerizable monomer composition was 1 according to the following evaluation standard, which is good.

[An Evaluation Item; A Photochromic Laminated Article]
(A Release Strength)

The obtained laminated article was made into the sample peace having the adhesive portion of 25×100 mm, and installed to the test machine (Autograph AG5000D, made by Shimadzu Corporation). The tensile test was carried out at the cross head speed of 100 mm/min, and measured the release strength. The photochromic laminated article used as the sample peace is the sample peace before and after the boiling test. Note the photochromic laminated article after the boiling test indicates the photochromic laminated article left in a boiling water for 1 hour.

(A Solvent Resistance)

The obtained photochromic laminated article was cut into a circle having a diameter of 65 mm, after immersing in the following various kinds of polymerizable monomer composition for 12 hours at a room temperature, appearance of the photochromic laminated article was visually evaluated. In addition, an elution amount of the photochromic compound was quantitated using a high-performance liquid chromatography. An evaluation standard was based on a four grade evaluation of 1 to 4, as shown below.

(An Evaluation Standard of the Solvent Resistance)

1; Although elution of urethane resin and photochromic compound could be seen in at least a part of an area, 0.2 mm or less from the end of the photochromic laminated article; a release between optical sheets and a photochromic adhesive agent layer could not be seen. The elution amount of the photochromic compound was 0.5 wt % or less, relative to the hole amount included in the photochromic laminated article.

2; Although elution of urethane resin and photochromic compound could be seen in at least a part of an area, 0.5 mm or less from the end of the photochromic laminated article; a release between optical sheets and a photochromic adhesive agent layer could not be seen. The elution amount of the photochromic compound was 1.0 wt % or less, relative to the hole amount included in the photochromic laminated article.

3; Although elution of urethane resin and photochromic compound could be seen in at least a part of an area, less than 1.0 mm from the end of the photochromic laminated article; a release between optical sheets and a photochromic adhesive agent layer could not be seen. The elution amount of the photochromic compound was less than 2.0 wt %, relative to the hole amount included in the photochromic laminated article.

4; Elution of urethane resin and photochromic compound could be seen in at least a part of an area, 1.0 mm or more from the end of the photochromic laminated article; and a release between optical sheets and a photochromic adhesive agent layer could be seen. The elution amount of the photochromic compound was 2.0 wt % or more, relative to the hole amount included in the photochromic laminated article.

(A Polymerizable Monomer Composition Used for the Evaluation of the Solvent Resistance)

Z1 (an acrylate monomer composition); A mixture of 20 parts by mass of trimethylolpropanetrimethacrylate, 40 parts by mass of polyethylene glycol diacrylate having an average molecular weight of 522, and 40 parts by mass of urethane-acrylate ("EBECRYL™4858" made by DAICEL CORPORATION).

Z2 (an allylic monomer composition); diethylene glycol bisallyl carbonate

Z3 (a thiourethane monomer composition); A mixture of 100 parts by mass of the isomer mixtures of dicyclohexylmethane-4,4'-diisocyanate and 63.0 parts by mass of 1,2-bis[(2-methylmercaptoethyl)thio]-3-mercaptopropane Z4 (a urethane monomer composition); A mixture of 100 parts by mass of polyester polyol having a number-average molecular weight of 1,000 comprising adipic acid and 1,6-hexanediol, 78 parts by mass of the isomer mixtures of dicyclohexylmethane 4,4'-diisocyanate, and 17 parts by mass of 2,4-diamino 3,5-diethyltoluene/2,4-diamino-3,5-diethyltoluene as aromatic diaminea curing agent Z5 (a thioepoxymonomer composition); A mixture of 95 parts by mass of bis((3-epithiopropylthio)ethane and 5 parts by mass of 2-mercaptoethanol (A Production of the Photochromic Lens (the Optical Article))

Subsequently, the obtained photochromic laminated article was cut into a circle having a diameter of 65 mm, set in a glass mold (set at 0.00 D, 70 mm lens diameter and 3.0 mm thickness) having a gasket; and then a mixture of 3 parts by mass of diisopropyl peroxydicarbonate as polymeric initiator and 100 parts by mass of diethylene glycol bisallyl carbonate, prepared as thermosetting composition was filled to the up and bottom of the laminated article set in the glass mold.

The glass mold, filled with the above mentioned thermosetting composition, was set in an air furnace, temperature was gradually raised from 40 to 90° C. taking 20 hours, and further held for 1 hour at 90° C.; and its polymerization was carried out. After the polymerization, taking out the gasket and the mold, a photochromic lens was obtained by carrying out a heat treatment for 2 hours at 120° C.

The obtained photochromic lens was evaluated according to the following method; and the optical color density was 1.1, the color fading speed was 90 seconds and the durability was 93% as the photochromic characteristic. Further, an elution of the photochromic compound or the polyurethane resin layer could not be seen from an appearance of the obtained photochromic lens; and it was "1" according to the following evaluation standard, which is good.

[An Evaluation Item; A Photochromic Lens]
(Photochromic Properties)

By using the obtained photochromic lens as the sample, the light was irradiated to said sample for 120 seconds using Xenon Lamp L-2480(300W) SHL-100 made by Hamamatsu Photonics K.K. via Aeromass filter (made by Corning Incorporated) at 23° C. and the beam intensity of 365 nm=2.4 mW/cm$^2$, 245 nm=24 μW/cm$^2$ at the multilayer surface for 120 seconds for the color development, and measured the photochromic characteristic of the laminated article.

The maximum absorption wave length (λmax): it is the maximum absorption wave length obtained from the spectrophotometer (Multichannel Photo Detector-MCPD1000) made by OTSUKA ELECTRONICS CO., LTD. Said maximum absorption wave length relates to the color tone during the color development.

The color optical density {ϵ(120)−ϵ(0)}: the difference between the absorbance ϵ(120) after irradiating for 120 seconds at said maximum absorption wave length and the absorbance ϵ(0) at no irradiation at the maximum absorption wave length. As this value is higher, it indicates that the photochromic property is further excellent.

The color fading speed {t½(sec.)}: the time required to reduce the absorbance at said maximum absorption wave length of the sample to be ½ when the light irradiation is stopped after 120 seconds irradiation. As this time is shorter, it indicates that the photochromic property is further excellent.

The durability (%)={(A48/A0)×100}: the accelerated deterioration test was carried out in order to evaluate the durability of the color development due to the light irradiation. That is, the obtained laminated article was carried out with the accelerated deterioration for 48 hours by Xenon Weather Meter X25 made by Suga Test Instrument Co., Ltd. Then, the evaluation of said color optical density was carried out before and after the test, and measured the color optical density before the test (A0) and the color optical density after the test (A48). The value obtained by {(A48)/A0}×100 was determined as the remaining ratio (%), and defined as the standard of the durability of the color development. As the remaining ratio is higher, it indicates that the durability is higher.

(An Evaluation of Appearance)

The obtained photochromic lens was visually evaluated. An evaluation standard was based on a four grade evaluation of 1 to 4, as shown below.

1; Although elution of urethane resin and photochromic compound could be seen in at least a part of an area, 0.2 mm or less from the end of the photochromic laminated article; a release between "optical sheets and a photochromic adhesive agent layer" and "optical sheets and a thermosetting resin" could not be seen.

2; Although elution of urethane resin and photochromic compound could be seen in at least a part of an area, 0.5 mm or less from the end of the photochromic laminated article; a release between "optical sheets and a photochromic adhesive agent layer" and "optical sheets and a thermosetting resin" could not be seen.

3; Although elution of urethane resin and photochromic compound could be seen in at least a part of an area, less than 1.0 mm from the end of the photochromic laminated article; a release between "optical sheets and a photochromic adhesive agent layer" and "optical sheets and a thermosetting resin" could not be seen.

4; Elution of urethane resin and photochromic compound could be seen in at least a part of an area, 1.0 mm or more from the end of the photochromic laminated article; and a release between "optical sheets and a photochromic adhesive agent layer" and "optical sheets and a thermosetting resin" could be seen.

The above evaluation results are shown in Tables 3 and 4.

Examples 2 to 38

The preparation of the photochromic composition was carried out as same as the method of Example 1, except for using the polyurethane resin ("A" component) and isocyanate compound ("C" component) shown in Tables 3 and 4. Note that, as same as example 1, the photochromic compound (PC1) was blended so that it is 5 parts by mass (the actual used amount 0.25 g) with respect to polyurethane resin ("A" component), and tetrahydrofuran (an organic solvent, "D" component; the actual used amount 36 g) was also blended. Further, by using the obtained photochromic composition, the photochromic laminated article and further the photochromic lens were produced as same method as example 1. Evaluation results thereof are shown in Tables 3 and 4.

TABLE 3

| Ex. No. | "A" component Type | "A" component Added amount (g) | "C" component Type | "C" component Added amount (g) | "D" component Type | "D" component Added amount (g) | Softening point (° C.) | Release strength (N/25 mm) initially | Release strength (N/25 mm) after the boiling |
|---|---|---|---|---|---|---|---|---|---|
| Ex. 1 | U1 | 5 | — | — | D1 | 36 | 150 | 75 | 60 |
| Ex. 2 | U2 | 5 | — | — | D1 | 36 | 90 | 80 | 70 |
| Ex. 3 | U3 | 5 | — | — | D1 | 36 | 140 | 80 | 70 |
| Ex. 4 | U4 | 5 | — | — | D1 | 36 | 110 | 85 | 70 |
| Ex. 5 | U5 | 5 | — | — | D1 | 36 | 135 | 90 | 80 |
| Ex. 6 | U6 | 5 | — | — | D1 | 36 | 135 | 90 | 80 |
| Ex. 7 | U7 | 5 | — | — | D1 | 36 | 150 | 75 | 60 |
| Ex. 8 | U8 | 5 | — | — | D1 | 36 | 90 | 80 | 70 |
| Ex. 9 | U9 | 5 | — | — | D1 | 36 | 140 | 80 | 70 |
| Ex. 10 | U10 | 5 | — | — | D1 | 36 | 110 | 80 | 70 |
| Ex. 11 | U11 | 5 | — | — | D1 | 36 | 135 | 85 | 70 |
| Ex. 12 | U12 | 5 | — | — | D1 | 36 | 135 | 90 | 80 |
| Ex. 13 | U13 | 5 | — | — | D1 | 36 | 130 | 90 | 75 |
| Ex. 14 | U14 | 5 | — | — | D1 | 36 | 140 | 85 | 75 |
| Ex. 15 | U15 | 5 | — | — | D1 | 36 | 125 | 90 | 80 |
| Ex. 16 | U16 | 5 | — | — | D1 | 36 | 125 | 90 | 80 |
| Ex. 17 | U17 | 5 | — | — | D1 | 36 | 140 | 85 | 75 |
| Ex. 18 | U18 | 5 | — | — | D1 | 36 | 170 | 80 | 70 |
| Ex. 19 | U23 | 5 | — | — | D1 | 36 | 140 | 100 | 80 |

| Ex. No. | Solvent resistance Z1 | Z2 | Z3 | Z4 | Z5 | Photochromic property $\lambda$max | Color optical density | Color fading speed | Durability | Appearance |
|---|---|---|---|---|---|---|---|---|---|---|
| Ex. 1 | 1 | 1 | 1 | 1 | 1 | 585 | 1.1 | 90 | 93 | 1 |
| Ex. 2 | 2 | 2 | 2 | 2 | 3 | 585 | 1.1 | 40 | 92 | 2 |
| Ex. 3 | 1 | 1 | 1 | 1 | 1 | 585 | 1.1 | 75 | 94 | 1 |
| Ex. 4 | 2 | 2 | 1 | 1 | 2 | 585 | 1.1 | 50 | 93 | 2 |
| Ex. 5 | 1 | 1 | 1 | 1 | 1 | 585 | 1.1 | 65 | 95 | 1 |
| Ex. 6 | 1 | 1 | 1 | 1 | 1 | 585 | 1.1 | 60 | 95 | 1 |
| Ex. 7 | 1 | 1 | 1 | 1 | 1 | 585 | 1.1 | 90 | 98 | 1 |
| Ex. 8 | 2 | 2 | 2 | 2 | 3 | 585 | 1.1 | 40 | 97 | 2 |
| Ex. 9 | 1 | 1 | 1 | 1 | 1 | 585 | 1.1 | 75 | 99 | 1 |
| Ex. 10 | 2 | 2 | 1 | 1 | 2 | 585 | 1.1 | 50 | 98 | 2 |
| Ex. 11 | 1 | 1 | 1 | 1 | 1 | 585 | 1.1 | 65 | 99 | 1 |
| Ex. 12 | 1 | 1 | 1 | 1 | 1 | 585 | 1.1 | 60 | 99 | 1 |
| Ex. 13 | 1 | 1 | 1 | 1 | 1 | 585 | 1.1 | 55 | 98 | 1 |
| Ex. 14 | 1 | 1 | 1 | 1 | 1 | 585 | 1.1 | 63 | 98 | 1 |
| Ex. 15 | 1 | 1 | 1 | 1 | 1 | 585 | 1.1 | 55 | 98 | 1 |
| Ex. 16 | 1 | 1 | 1 | 1 | 1 | 585 | 1.1 | 55 | 98 | 1 |
| Ex. 17 | 1 | 1 | 1 | 1 | 1 | 585 | 1.1 | 65 | 98 | 1 |
| Ex. 18 | 1 | 1 | 1 | 1 | 1 | 585 | 1.1 | 100 | 97 | 1 |
| Ex. 19 | 1 | 1 | 1 | 1 | 1 | 585 | 1.1 | 57 | 98 | 1 |

TABLE 4

| Ex. No. | "A" component Type | "A" component Added amount (g) | "C" component Type | "C" component Added amount (g) | "D" component Type | "D" component Added amount (g) | Softening point (°C.) | Release strength (N/25 mm) initially | Release strength (N/25 mm) After the boiling |
|---|---|---|---|---|---|---|---|---|---|
| Ex. 20 | U1 | 5 | C1 | 0.15 | D1 | 36 | 155 | 125 | 115 |
| Ex. 21 | U2 | 5 | C1 | 0.15 | D1 | 36 | 100 | 125 | 120 |
| Ex. 22 | U3 | 5 | C1 | 0.15 | D1 | 36 | 145 | 130 | 120 |
| Ex. 23 | U4 | 5 | C1 | 0.15 | D1 | 36 | 120 | 135 | 125 |
| Ex. 24 | U5 | 5 | C1 | 0.15 | D1 | 36 | 140 | 140 | 130 |
| Ex. 25 | U6 | 5 | C1 | 0.15 | D1 | 36 | 140 | 140 | 135 |
| Ex. 26 | U7 | 5 | C1 | 0.15 | D1 | 36 | 155 | 125 | 115 |
| Ex. 27 | U8 | 5 | C1 | 0.15 | D1 | 36 | 100 | 125 | 120 |
| Ex. 28 | U9 | 5 | C1 | 0.15 | D1 | 36 | 145 | 130 | 120 |
| Ex. 29 | U10 | 5 | C1 | 0.15 | D1 | 36 | 120 | 135 | 125 |
| Ex. 30 | U11 | 5 | C1 | 0.15 | D1 | 36 | 140 | 140 | 130 |
| Ex. 31 | U12 | 5 | C1 | 0.15 | D1 | 36 | 140 | 140 | 135 |
| Ex. 32 | U13 | 5 | C1 | 0.15 | D1 | 36 | 135 | 135 | 125 |
| Ex. 33 | U14 | 5 | C1 | 0.15 | D1 | 36 | 150 | 140 | 135 |
| Ex. 34 | U15 | 5 | C1 | 0.15 | D1 | 36 | 130 | 140 | 135 |
| Ex. 35 | U16 | 5 | C1 | 0.15 | D1 | 36 | 130 | 140 | 135 |
| Ex. 36 | U17 | 5 | C1 | 0.15 | D1 | 36 | 145 | 135 | 130 |
| Ex. 37 | U18 | 5 | C1 | 0.15 | D1 | 36 | 175 | 120 | 110 |
| Ex. 38 | U23 | 5 | C1 | 0.15 | D1 | 36 | 140 | 145 | 130 |

| Ex. No. | Solvent resistance Z1 | Z2 | Z3 | Z4 | Z5 | Photochromic property λmax | Color optical density | Color fading speed | Durability | Appearance |
|---|---|---|---|---|---|---|---|---|---|---|
| Ex. 20 | 1 | 1 | 1 | 1 | 1 | 585 | 1.1 | 92 | 93 | 1 |
| Ex. 21 | 2 | 2 | 1 | 2 | 2 | 585 | 1.1 | 40 | 92 | 2 |
| Ex. 22 | 1 | 1 | 1 | 1 | 1 | 585 | 1.1 | 77 | 94 | 1 |
| Ex. 23 | 1 | 2 | 1 | 1 | 2 | 585 | 1.1 | 52 | 92 | 2 |
| Ex. 24 | 1 | 1 | 1 | 1 | 1 | 585 | 1.1 | 65 | 94 | 1 |
| Ex. 25 | 1 | 1 | 1 | 1 | 1 | 585 | 1.1 | 62 | 94 | 1 |
| Ex. 26 | 1 | 1 | 1 | 1 | 1 | 585 | 1.1 | 90 | 96 | 1 |
| Ex. 27 | 2 | 2 | 1 | 2 | 2 | 585 | 1.1 | 41 | 95 | 2 |
| Ex. 28 | 1 | 1 | 1 | 1 | 1 | 585 | 1.1 | 77 | 97 | 1 |
| Ex. 29 | 1 | 2 | 1 | 1 | 2 | 585 | 1.1 | 50 | 98 | 2 |
| Ex. 30 | 1 | 1 | 1 | 1 | 1 | 585 | 1.1 | 65 | 99 | 1 |
| Ex. 31 | 1 | 1 | 1 | 1 | 1 | 585 | 1.1 | 61 | 99 | 1 |
| Ex. 32 | 1 | 1 | 1 | 1 | 1 | 585 | 1.1 | 55 | 98 | 1 |
| Ex. 33 | 1 | 1 | 1 | 1 | 1 | 585 | 1.1 | 63 | 99 | 1 |
| Ex. 34 | 1 | 1 | 1 | 1 | 1 | 585 | 1.1 | 55 | 98 | 1 |
| Ex. 35 | 1 | 1 | 1 | 1 | 1 | 585 | 1.1 | 55 | 98 | 1 |
| Ex. 36 | 1 | 1 | 1 | 1 | 1 | 585 | 1.1 | 65 | 98 | 1 |
| Ex. 37 | 1 | 1 | 1 | 1 | 1 | 585 | 1.1 | 102 | 98 | 1 |
| Ex. 38 | 1 | 1 | 1 | 1 | 1 | 585 | 1.1 | 58 | 98 | 1 |

Comp. Ex. 1 and 2

The preparation of the photochromic composition was carried out as same as the method of Example 1, except for using the polyurethane resin shown in Table 5. Note that, as same as example 1, the photochromic compound (PC1) was blended so that it is 5 parts by mass (the actual used amount 0.25 g) with respect to polyurethane resin ("A" component), and tetrahydrofuran (an organic solvent, "D" component; the actual used amount 36 g) was also blended. Further, by using the obtained photochromic composition, the photochromic laminated article and further the photochromic lens were produced as same method as example 1. Evaluation results thereof are shown in Table 5. Note that synthesis conditions of the used polyurethane resin are shown in Table 1, while ratio of each component and the other properties of the polyurethane resin are shown in Table 2.

TABLE 5

| Ex. No. | "A" component Type | "A" component Added amount (g) | "C" component Type | "C" component Added amount (g) | "D" component Type | "D" component Added amount (g) | Softening point (°C.) | Release strength (N/25 mm) initially | Release strength (N/25 mm) After the boiling | Solvent resistance Z1 | Z2 | Z3 | Z4 | Z5 | Photochromic property λmax | Color optical density | Color fading speed | Durability | Appearance |
|---|---|---|---|---|---|---|---|---|---|---|---|---|---|---|---|---|---|---|---|
| Comp Ex. 1 | U19 | 5 | — | — | D1 | 36 | 75 | 60 | 40 | 3 | 3 | 2 | 3 | 3 | 585 | 1.1 | 45 | 90 | 3 |

TABLE 5-continued

| | "A" component | | "C" component | | "D" component | | Soft- ening point | Release strength (N/25 mm) | | Pphotochromic property | | | | | | | | |
|---|---|---|---|---|---|---|---|---|---|---|---|---|---|---|---|---|---|---|
| | | | | | | | | | | Solvent resistance | | | | | Color optical | Color fading | Dura- | Ap- pear- |
| Ex. No. | Type | Added amount (g) | Type | Added amount (g) | Type | Added amount (g) | (°C.) | initially | After the boiling | Z1 | Z2 | Z3 | Z4 | Z5 | λmax | density | speed | bility | ance |
| Comp Ex. 2 | U20 | 5 | — | — | D1 | 36 | 100 | 60 | 40 | 3 | 3 | 2 | 3 | 3 | 585 | 1.1 | 50 | 90 | 3 |

Comp. Ex. 3

Urethane prepolymer (U21-a), having the isocyanate group at a terminal end of the molecular chain, and urethane prepolymer (U21-b), having the hydroxyl group at a terminal end of the molecular chain, were synthesized according to the methods below.

Synthesis of Urethane Prepolymer (U21-a)

211 g of polyol compound (PL3: polypropylene glycol) having the number average molecular weight of 700 and 118 g of isomer mixtures of dicyclohexylmethane 4,4'-diisocyanate were added into a three-necked flask having a stirring blade, a cooling pipe, a thermometer, and nitrogen gas introducing pipe; and reacted under nitrogen atmosphere at 80° C. for 9 hours; thereby urethane prepolymer (U21-a) having —NCO group at its terminal end was obtained. The molecular weight of the obtained urethane prepolymer (U21-a) was 2,200 (the theoretical value: 2,200) in terms of polyoxyethylene.

Synthesis of Urethane Prepolymer (U21-b)

241 g of polyol compound (PL3: polypropylene glycol) having the number average molecular weight of 700 and 30 g of toluene-2,4-diisocyanate (NCO4) were added into a three-necked flask having a stirring blade, a cooling pipe, a thermometer, and nitrogen gas introducing pipe; and reacted under nitrogen atmosphere at 80° C. for 9 hours; thereby urethane prepolymer (U21-b) having —OH group at its terminal end was obtained. The molecular weight of the obtained urethane prepolymer (U21-b) resin was 1,600 (the theoretical value: 1,600) in terms of polyoxyethylene.

The preparation of the photochromic composition was carried out as same as the method of Example 1, by using the above obtained urethane prepolymer (U21-a) and urethane prepolymer (U21-b) in a blended ratio shown in Table 6, and by using 43.3 g of tetrahydrofuran (D1) as an organic solvent and 0.31 g of photochromic compound (PC1). Further, by using the obtained photochromic composition, the photochromic laminated article and further the photochromic lens were produced as same method as example 1. Evaluation results thereof are shown in Table 6. Note that synthesis conditions of the used polyurethane resin are shown in Table 1, while ratio and the other properties according to each component of the polyurethane resin are shown in Table 2.

Comp. Ex. 4

Urethane prepolymer (U22-a), having the isocyanate group at a terminal end of the molecular chain, and urethane prepolymer (U22-b), having the hydroxyl group at a terminal end of the molecular chain, were synthesized according to the methods below.

Synthesis of Urethane Prepolymer (U22-a)

289 g of polyol compound (PL1: polycarbonate diol) having the number average molecular weight of 800 and 120 g of isophorone diisocyanate (NCO1) were added into a three-necked flask having a stirring blade, a cooling pipe, a thermometer, and nitrogen gas introducing pipe; and reacted under nitrogen atmosphere at 80° C. for 9 hours; thereby urethane prepolymer (U22-a) having —NCO group at its terminal end was obtained. The molecular weight of the obtained urethane prepolymer (U22-a) resin was 2,300 (the theoretical value: 2,300) in terms of polyoxyethylene.

Synthesis of Urethane Prepolymer (U22-b)

276 g of polyol compound (PL1: polycarbonate diol) having the number average molecular weight of 800 and 30 g of toluene 2,4-diisocyanate (NCO4) were added into a three-necked flask having a stirring blade, a cooling pipe, a thermometer, and nitrogen gas introducing pipe; and reacted under nitrogen atmosphere at 80° C. for 9 hours; thereby urethane prepolymer (U22-b) having —OH group at its terminal end was obtained. The molecular weight of the obtained urethane prepolymer (U22-b) resin was 1,800 (the theoretical value: 1,800) in terms of polyoxyethylene.

The preparation of the photochromic composition was carried out as same as the method of Example 1, by using the above obtained urethane prepolymer (U22-a) and urethane prepolymer (U22-b) in a blended ratio shown in Table 6, and by using 44 g of tetrahydrofuran (D1) as an organic solvent and 0.31 g of photochromic compound (PC1). Further, by using the obtained photochromic composition, the photochromic laminated article and further the photochromic lens were produced as same method as example 1. Evaluation results thereof are shown in Table 6. Note that synthesis conditions of the used polyurethane resin are shown in Table 1, while ratio of each component and the other properties of the polyurethane resin are shown in Table 2.

TABLE 6

| | The urethane | | The urethane | | "D" component | | Soft- ening point | Release strength | | Pphotochromic property | | | | | | | | |
|---|---|---|---|---|---|---|---|---|---|---|---|---|---|---|---|---|---|---|
| | | | | | | | | | | Solvent resistance | | | | | Color optical | Color fading | Dura- | Ap- pear- |
| Ex. No. | Type | Added amount (g) | Type | Added amount (g) | Type | Added amount (g) | (°C.) | ini- tially | After the boiling | Z1 | Z2 | Z3 | Z4 | Z5 | λmax | density | speed | bility | ance |
| Comp Ex. 3 | U21-a | 5 | U21-b | 0.91 | D1 | 43.3 | 70 | 50 | 35 | 4 | 4 | 3 | 3 | 4 | 585 | 1.1 | 50 | 80 | 4 |

TABLE 6-continued

| Ex. No. | The urethane Type | Added amount (g) | The urethane Type | Added amount (g) | "D" component Type | Added amount (g) | Softening point (°C) | Release strength initially | Release strength After the boiling | Solvent resistance Z1 | Z2 | Z3 | Z4 | Z5 | Photochromic property λmax | Color optical density | Color fading speed | Durability | Appearance |
|---|---|---|---|---|---|---|---|---|---|---|---|---|---|---|---|---|---|---|---|
| Comp Ex. 4 | U22-a | 5 | U22-b | 0.98 | D1 | 44 | 65 | 50 | 40 | 4 | 4 | 3 | 3 | 4 | 585 | 1.1 | 50 | 80 | 4 |

As is obvious from the above Ex. 1 to 38, the photochromic laminated article and the photochromic lens showing an excellent heat resistance, solvent resistance, release strength (adhesion) and photochromic properties can be obtained by using the polyurethane resin ("A" component) having the isocyanurate structure of the invention. Among these, according to Ex. 7 to 19 and 26 to 38, piperidine structure was introduced at a terminal end of the polyurethane resin ("A" component) having the isocyanurate structure; and thus, an excellent photochromic properties, and in particular, an excellent durability were shown. Further, according to Ex. 19 to 36, an excellent adhesion of the release strength initially and after the boiling test was obtained by adding isocyanate compound.

While according to Comp. Ex. 1 to 4, the solvent resistance was insufficient, and the release strength initially and after the boiling test were also insufficient; and this is due to using the polyurethane resin with no isocyanurate structure.

The invention claimed is:

1. An optical article having a multilayer structure wherein two optical sheets or optical films facing each other are bound via an adhesive layer comprising a photochromic composition comprising a polyurethane resin (A) having an isocyanurate structure and a photochromic compound (B), wherein said polyurethane resin (A) having the isocyanurate structure is the polyurethane resin obtained by reacting, a polyol compound (A1) having two or more hydroxyl groups in the molecule, and having a number-average molecular weight of 400 to 3,000, an isocyanurate compound (A2a) having an isocyanurate structure and three isocyanate groups in the molecule, a diisocyanate compound (A2b) having two isocyanate groups in the molecule, and a chain extender (A3) having two or more groups capable of reacting with the isocyanate groups in the molecule, and having a molecular weight of 50 to 300.

2. The optical article as set forth in claim 1, having the multilayer structure wherein at least one of the two optical sheets or optical films facing each other is made of polycarbonate resin.

3. A production method of the optical article as set forth in claim 1, comprising:

a step of preparing a photochromic adhesive sheet comprising the polyurethane resin (A) having the isocyanurate structure and the photochromic compound (B), by extending a photochromic composition comprising a polyurethane resin (A) having an isocyanurate structure, a photochromic compound (B), and an organic solvent (D), wherein said polyurethane resin (A) having the isocyanurate structure is the polyurethane resin obtained by reacting, a polyol compound (A1) having two or more hydroxyl groups in the molecule, and having a number-average molecular weight of 400 to 3,000, an isocyanurate compound (A2a) having an isocyanurate structure and three isocyanate groups in the molecule, a diisocyanate compound (A2b) having two isocyanate groups in the molecule, and a chain extender (A3) having two or more groups capable of reacting with the isocyanate groups in the molecule, and having a molecular weight of 50 to 300 on a flat and smooth base material, then removing the organic solvent (D) by drying and separating said flat and smooth base material; and a step of forming said multilayer structure by binding the two optical sheets or optical films by placing said photochromic adhesive sheet in between the two optical sheets or optical films facing each other.

4. The optical article as set forth in claim 1, wherein an amount ratio of the components (A1), (A2a), (A2b) and (A3) used when obtaining the polyurethane resin (A) having the isocyanurate structure satisfies $n1:n2a:n2b:n3=0.30$ to $0.90:0.01$ to $0.50:0.50$ to $0.99:0.10$ to $0.70$, wherein $n2a+n2b=1$ and $0.9 \leq n1+n3 \leq 1.1$, when a total mol number of a hydroxyl group included in said component (A1) is $n1$, a total mol number of an isocyanate group included in said component (A2a) is $n2a$, a total mol number of the isocyanate group included in said component (A2b) is $n2b$, and a total mol number of a group capable of reacting with the isocyanate group included in said component (A3) is $n3$.

5. The optical article as set forth in claim 1, wherein the polyurethane resin (A) having the isocyanurate structure is a non-reactive polyurethane resin, to which a reaction terminator (A4), having one group capable of reacting with the isocyanate group, is bound to a terminal end of the molecule.

6. The optical article as set forth in claim 5, wherein an amount ratio of the components (A1), (A2a), (A2b), (A3) and (A4) used when obtaining the non-reactive polyurethane resin satisfies $n1:n2a:n2b:n3:n4=0.30$ to $0.89:0.01$ to $0.50:0.50$ to $0.99:0.10$ to $0.69:0.01$ to $0.20$, wherein $n2a n2b=1$ and $0.9 \leq n1+n3+n4 \leq 1.1$, when a total mol number of the hydroxyl group included in said component (A1) is $n1$, a total mol number of the isocyanate group included in said component (A2a) is $n2a$, a total mol number of the isocyanate group included in said component (A2b) is $n2b$, a total mol number of a group capable of reacting with the isocyanate group included in said component (A3) is $n3$, and a total mol number of the group capable of reacting with the isocyanate group included in said component (A4) is $n4$.

7. The optical article as set forth in claim 1, wherein 30 mass % or more of a total amount of said isocyanurate compound (A2a) and said diisocyanate compound (A2b) is at least one isocyanate compound selected from the group consisting of aliphatic isocyanate compounds and alicyclic isocyanate compounds.

8. The optical article as set forth in claim 1, wherein the photochromic composition further comprising an isocyanate compound (C) having at least one isocyanate group in the molecule.

9. The optical article as set forth in claim 8, wherein a molecular weight of said isocyanate compound (C) is less than 1,000 and said isocyanate compound (C) is not a polymer.

10. The optical article as set forth in claim 1, wherein the photochromic composition comprises 0.1 to 20 parts by mass of said photochromic compound (B) to 100 parts by mass of said polyurethane resin (A) having the isocyanurate structure.

11. The optical article as set forth in claim 1, wherein the photochromic composition further comprises 0.01 to 20 parts by mass of an isocyanate compound (C) having at least one isocyanate group in the molecule to 100 parts by mass of said polyurethane resin (A) having the isocyanurate structure.

12. The production method as set forth in claim 3, wherein the photochromic composition comprises 0.1 to 20 parts by mass of said photochromic compound (B) to 100 parts by mass of said polyurethane resin (A) having the isocyanurate structure.

13. The production method as set forth in claim 12, wherein the photochromic composition further comprises 0.01 to 20 parts by mass of an isocyanate compound (C) having at least one isocyanate group in the molecule to 100 parts by mass of said polyurethane resin (A) having the isocyanurate structure.

14. The production method as set forth in claim 12, wherein the photochromic composition further comprises 5 to 900 parts by mass of said organic solvent (D) to 100 parts by mass of said polyurethane resin (A) having the isocyanurate structure.

15. The production method as set forth in claim 12, wherein the photochromic composition further comprises 0.01 to 20 parts by mass of an isocyanate compound (C) having at least one isocyanate group in the molecule and 5 to 900 parts by mass of said organic solvent (D) to 100 parts by mass of said polyurethane resin (A) having the isocyanurate structure.

\* \* \* \* \*